US008062111B2

(12) United States Patent
Aronson et al.

(10) Patent No.: US 8,062,111 B2
(45) Date of Patent: Nov. 22, 2011

(54) SYSTEMS AND METHODS FOR PROVIDING FIXED-ODDS AND PARI-MUTUEL WAGERING

(75) Inventors: Thomas L Aronson, Boulder, CO (US); Richard E McNutt, Lafayette, CO (US)

(73) Assignee: ODS Properties, Inc., Los Angeles, CA (US)

( * ) Notice: Subject to any disclaimer, the term of this patent is extended or adjusted under 35 U.S.C. 154(b) by 1424 days.

(21) Appl. No.: 10/745,243

(22) Filed: Dec. 22, 2003

(65) Prior Publication Data

US 2004/0147312 A1 Jul. 29, 2004

Related U.S. Application Data

(63) Continuation of application No. 09/996,050, filed on Nov. 28, 2001, now Pat. No. 6,695,701.

(60) Provisional application No. 60/253,586, filed on Nov. 28, 2000.

(51) Int. Cl.
*A63F 13/00* (2006.01)

(52) U.S. Cl. .................... 463/6; 463/25; 463/28; 463/29

(58) Field of Classification Search ................ 463/6, 25, 463/28, 29
See application file for complete search history.

(56) References Cited

U.S. PATENT DOCUMENTS

| | | | | |
|---|---|---|---|---|
| 3,909,002 | A | 9/1975 | Levy | 273/138 A |
| 4,033,588 | A | 7/1977 | Watts | 273/138 A |
| 4,108,361 | A | 8/1978 | Krause | 235/375 |
| 4,322,612 | A | 3/1982 | Lange | 235/419 |
| 4,339,798 | A | 7/1982 | Hedges et al. | 364/412 |
| 4,372,558 | A | 2/1983 | Shimamoto et al. | 273/238 |
| 4,494,197 | A | 1/1985 | Troy et al. | 364/412 |
| 4,593,904 | A | 6/1986 | Graves | 273/1 E |
| 4,636,951 | A | 1/1987 | Harlick | 364/412 |
| 4,652,998 | A | 3/1987 | Koza et al. | 364/412 |
| 4,689,742 | A | 8/1987 | Troy et al. | 364/412 |
| 4,694,490 | A | 9/1987 | Harvey et al. | 380/234 |
| 4,704,725 | A | 11/1987 | Harvey et al. | 380/9 |
| 4,706,121 | A | 11/1987 | Young | 358/142 |
| 4,745,468 | A | 5/1988 | Von Kohorn | 358/84 |

(Continued)

FOREIGN PATENT DOCUMENTS

EP 0 387 046 A2 9/1990

(Continued)

OTHER PUBLICATIONS

You Bet Help File, Youbet.com, Inc., Los Angeles, California, last modified Jul. 11, 1998, pp. 1-132.
Maury Wolff, "Interactive Wagering a Good Bet," Daily Racing Form, Jan. 29, 1995, p. 4.
John Burgess, "And We're Off to the Races!" The Washington Post, Jan. 16, 1995, pp. 17-18.

(Continued)

*Primary Examiner* — Peter DungBa Vo
*Assistant Examiner* — Jeffrey Wong
(74) *Attorney, Agent, or Firm* — Ropes & Gray LLP; Matthew S. Bertenthal

(57) ABSTRACT

The present invention provides systems and methods for providing a user with the ability to submit a wager to a fixed-odds book or a pari-mutuel pool using an interactive wagering application. A conditional wagering option is provided. When the user selects a conditional wagering option, the interactive wagering application may automatically submit the wager to an alternative wager option (e.g., a fixed-odds book or a pari-mutuel pool) if the wager is rejected by the user's selected wager option. The interactive wagering application may notify the user of the status of the submitted wager.

56 Claims, 18 Drawing Sheets

U.S. PATENT DOCUMENTS

| | | | | |
|---|---|---|---|---|
| 4,747,600 | A | 5/1988 | Richardson | 273/269 |
| 4,760,527 | A | 7/1988 | Sidley | 364/412 |
| 4,764,666 | A | 8/1988 | Bergeron | 235/380 |
| 4,775,937 | A | 10/1988 | Bell | 463/28 |
| 4,799,683 | A | 1/1989 | Bruner, Jr. | 273/439 |
| 4,815,741 | A | 3/1989 | Small | 273/138 A |
| 4,882,473 | A | 11/1989 | Bergeron et al. | 235/380 |
| 4,922,522 | A | 5/1990 | Scanlon | 379/95 |
| 4,926,255 | A | 5/1990 | Von Kohorn | 358/84 |
| 4,926,327 | A | 5/1990 | Sidley | 364/412 |
| 4,965,825 | A | 10/1990 | Harvey et al. | 380/233 |
| 4,969,183 | A | 11/1990 | Reese | 379/88 |
| 4,996,705 | A | 2/1991 | Entenmann et al. | 379/91 |
| 5,007,649 | A | 4/1991 | Richardson | 273/237 |
| 5,034,807 | A | 7/1991 | Von Kohorn | 358/84 |
| 5,054,787 | A | 10/1991 | Richardson | 273/369 |
| 5,057,915 | A | 10/1991 | Von Kohorn | 358/84 |
| 5,083,271 | A | 1/1992 | Thacher et al. | 364/411 |
| 5,083,272 | A | 1/1992 | Walker et al. | 364/412 |
| 5,083,800 | A | 1/1992 | Lockton | 273/439 |
| 5,096,195 | A | 3/1992 | Gimmon | 273/138 |
| 5,096,202 | A | 3/1992 | Hesland | 273/237 |
| 5,112,050 | A | 5/1992 | Koza et al. | 273/139 |
| 5,119,295 | A | 6/1992 | Kapur | 364/412 |
| 5,178,389 | A | 1/1993 | Bentley et al. | 273/138 |
| 5,186,471 | A | 2/1993 | Vancraeynest | 273/439 |
| 5,218,631 | A | 6/1993 | Katz | 463/41 |
| 5,227,874 | A | 7/1993 | Von Kohorn | 358/84 |
| 5,233,654 | A | 8/1993 | Harvey et al. | 380/20 |
| 5,249,044 | A | 9/1993 | Von Kohorn | 358/86 |
| 5,276,312 | A | 1/1994 | McCarthy | 235/380 |
| 5,280,426 | A | 1/1994 | Edmonds | 364/408 |
| 5,282,620 | A | 2/1994 | Keesee | 273/138 |
| 5,283,734 | A | 2/1994 | Von Kohorn | 364/412 |
| 5,286,023 | A | 2/1994 | Wood | 273/138 |
| 5,297,802 | A | 3/1994 | Pocock et al. | 273/439 |
| 5,326,104 | A | 7/1994 | Pease et al. | 273/138 |
| 5,327,485 | A | 7/1994 | Leaden | 379/95 |
| 5,333,868 | A | 8/1994 | Goldfarb | 273/138 |
| 5,340,119 | A | 8/1994 | Goldfarb | 273/439 |
| 5,351,970 | A | 10/1994 | Fioretti | 273/439 |
| 5,354,069 | A | 10/1994 | Guttman et al. | 273/439 |
| 5,365,575 | A | 11/1994 | Katz | 379/92 |
| 5,398,932 | A | 3/1995 | Eberhardt et al. | 273/138 |
| 5,403,999 | A | 4/1995 | Entenmann et al. | 235/379 |
| 5,408,417 | A | 4/1995 | Wilder | 364/479 |
| 5,411,258 | A | 5/1995 | Wilson | |
| 5,415,416 | A | 5/1995 | Scagnelli et al. | 273/439 |
| 5,417,424 | A | 5/1995 | Snowden et al. | 273/138 |
| 5,505,449 | A | 4/1996 | Eberhardt et al. | 273/138 |
| 5,507,489 | A | 4/1996 | Reibel et al. | 273/138 |
| 5,518,253 | A | 5/1996 | Pocock et al. | 273/439 |
| 5,539,450 | A | 7/1996 | Handelman | 348/12 |
| 5,539,822 | A | 7/1996 | Lett | 380/20 |
| 5,545,088 | A | 8/1996 | Kravitz et al. | 463/40 |
| 5,564,977 | A | 10/1996 | Algie | 463/25 |
| 5,569,083 | A | 10/1996 | Fioretti | 463/19 |
| 5,573,244 | A | 11/1996 | Mindes | 463/26 |
| 5,575,474 | A | 11/1996 | Rossides | 463/26 |
| 5,577,727 | A | 11/1996 | Brame et al. | 273/139 |
| 5,586,937 | A | 12/1996 | Menashe | 463/41 |
| 5,608,785 | A | 3/1997 | Kasday | 379/90 |
| 5,643,088 | A | 7/1997 | Vaughn et al. | 463/40 |
| 5,647,795 | A | 7/1997 | Stanton | 463/1 |
| 5,672,106 | A | 9/1997 | Orford et al. | 463/28 |
| 5,679,077 | A | 10/1997 | Pocock et al. | 463/19 |
| 5,683,090 | A | 11/1997 | Zeile et al. | 273/269 |
| 5,688,174 | A | 11/1997 | Kennedy | 463/37 |
| 5,713,795 | A | 2/1998 | Kohorn | 463/17 |
| 5,722,890 | A | 3/1998 | Libby et al. | 463/17 |
| 5,729,212 | A | 3/1998 | Martin | 340/870.28 |
| 5,746,657 | A | 5/1998 | Ueno | 463/41 |
| 5,749,785 | A | 5/1998 | Rossides | 463/25 |
| 5,755,621 | A | 5/1998 | Marks et al. | 463/42 |
| 5,759,101 | A | 6/1998 | Von Kohorn | 463/40 |
| 5,762,552 | A | 6/1998 | Vuong et al. | 463/25 |
| 5,772,511 | A | 6/1998 | Smeltzer | 463/17 |
| 5,787,156 | A | 7/1998 | Katz | 379/93.13 |
| 5,800,268 | A | 9/1998 | Molnick | 463/40 |
| 5,816,917 | A | 10/1998 | Kelmer et al. | 463/16 |
| 5,816,919 | A | 10/1998 | Scagnelli et al. | 463/25 |
| 5,823,879 | A | 10/1998 | Goldberg et al. | 463/42 |
| 5,830,067 | A | 11/1998 | Graves et al. | 463/40 |
| 5,830,068 | A | 11/1998 | Brenner et al. | 463/42 |
| 5,830,069 | A | 11/1998 | Soltesz et al. | 463/42 |
| 5,842,921 | A | 12/1998 | Mindes et al. | 463/16 |
| 5,871,398 | A | 2/1999 | Schneier et al. | 463/16 |
| 5,873,782 | A | 2/1999 | Hall | 463/25 |
| 5,910,047 | A | 6/1999 | Scagnelli et al. | 463/17 |
| 5,954,582 | A | 9/1999 | Zach | 463/25 |
| 5,957,775 | A | 9/1999 | Cherry | 463/16 |
| 5,999,808 | A | 12/1999 | LaDue | 455/412 |
| 6,001,016 | A | 12/1999 | Walker et al. | 463/42 |
| 6,004,211 | A | 12/1999 | Brenner et al. | |
| 6,007,426 | A | 12/1999 | Kelly et al. | 463/16 |
| 6,023,685 | A | 2/2000 | Brett et al. | |
| 6,024,640 | A | 2/2000 | Walker et al. | 463/17 |
| 6,024,641 | A | 2/2000 | Sarno | 463/17 |
| 6,030,288 | A | 2/2000 | Davis et al. | 463/29 |
| 6,033,308 | A * | 3/2000 | Orford et al. | 463/28 |
| 6,080,062 | A | 6/2000 | Olson | 463/42 |
| 6,080,063 | A | 6/2000 | Khosla | 463/42 |
| 6,099,408 | A | 8/2000 | Schneier et al. | 463/29 |
| 6,102,797 | A | 8/2000 | Kail | 463/16 |
| 6,117,011 | A | 9/2000 | Lvov | 463/25 |
| 6,117,013 | A | 9/2000 | Eiba | 463/41 |
| 6,152,824 | A | 11/2000 | Rothschild et al. | 463/42 |
| 6,186,892 | B1 | 2/2001 | Frank et al. | 463/19 |
| 6,203,427 | B1 | 3/2001 | Walker et al. | 463/16 |
| 6,251,016 | B1 | 6/2001 | Tsuda et al. | 463/42 |
| 6,251,017 | B1 | 6/2001 | Leason et al. | 463/42 |
| 6,254,480 | B1 | 7/2001 | Zach | 463/17 |
| 6,257,982 | B1 | 7/2001 | Rider et al. | 463/31 |
| 6,263,054 | B1 | 7/2001 | Haefliger | 379/93.13 |
| 6,264,560 | B1 | 7/2001 | Goldberg et al. | 463/42 |
| 6,272,223 | B1 | 8/2001 | Carlson | 380/251 |
| 6,273,820 | B1 | 8/2001 | Haste, III | 463/40 |
| 2001/0003099 | A1 | 6/2001 | Von Kohorn | 463/40 |
| 2001/0003100 | A1 | 6/2001 | Yacenda | 463/41 |
| 2001/0036858 | A1 * | 11/2001 | McNutt et al. | 463/25 |
| 2001/0047291 | A1 * | 11/2001 | Garahi et al. | 705/10 |

FOREIGN PATENT DOCUMENTS

| | | | |
|---|---|---|---|
| EP | 0 583 196 | A1 | 2/1994 |
| EP | 0 620 688 | A2 | 10/1994 |
| EP | 0 624 039 | A2 | 11/1994 |
| EP | 0 673 004 | A2 | 9/1995 |
| EP | 0 873 772 | A1 | 10/1998 |
| EP | 0 934 765 | A1 | 8/1999 |
| GB | 2180675 | | 4/1987 |
| GB | 2 300 535 | A | 11/1996 |
| JP | 01-25659 | | 1/1989 |
| JP | 01-269157 | | 10/1989 |
| JP | 02-110660 | | 4/1990 |
| JP | 02-231671 | | 9/1990 |
| JP | 06-325062 | | 11/1994 |
| NZ | 272983 | | 2/1997 |
| WO | WO 95/01058 | | 1/1995 |
| WO | WO 95/22883 | | 8/1995 |
| WO | WO 95/30944 | | 11/1995 |
| WO | WO 97/19428 | | 5/1997 |
| WO | WO 01/78289 | A2 | 10/2001 |

OTHER PUBLICATIONS

Ross Peddicord, "New On TV: You Bet Your Horse," The Sun, Baltimore, Maryland, Dec. 15, 1994.

Yee-Hsiang Chang et al., "An Open-Systems Approach To Video On Demand," IEEE Communications Magazine, May 1994, pp. 68-80.

TrackMaster User's Guide Version 2.0.7, Apr. 1994, AXCIS Pocket Information Network, Inc., Santa Clara, California, pp. 1-122.

Tiny Time Brochure, AutoTote Systems, Inc., Network, Delaware (undated).

Probe XL Brochure, AutoTote Systems, Inc., Network, Delaware (undated).

US 5,823,877, 10/1998, Scagnelli et al. (withdrawn)

* cited by examiner

SYSTEMS AND METHODS FOR PROVIDING FIXED-ODDS AND PARI-MUTUEL WAGERING

PRIORITY CLAIM

This application is a continuation of U.S. patent application Ser. No. 09/996,050, filed Nov. 28, 2001, which claims the benefit of U.S. provisional patent application No. 60/253,586, filed Nov. 28, 2000. Both of these prior applications are hereby incorporated by reference herein in their entireties.

BACKGROUND OF THE INVENTION

This invention relates to interactive wagering systems and methods for providing fixed-odds and pari-mutuel wagering. More particularly, this invention relates to systems and methods for providing conditional fixed-odds and pari-mutuel wagering that enable wagers to be placed automatically in either a fixed-odds book or a pari-mutuel pool.

Wagering on sporting events such as horse, dog, and harness racing is a popular leisure activity. Generally, there are two means to conduct wagering fixed-odds bookmaking and pooling (i.e. any form of pari-mutuel wagering). The major difference is that the bookmaker effectively competes with the player by negotiating a price and reaching an agreement that fixes the odds for a particular bet (hence, "fixed odds") while balancing an internal book that attempts to guarantee himself a profit but carries inevitable risk. In pari-mutuel wagering, by contrast, players essentially compete against the other players and the odds are adjusted accordingly until the betting is closed.

Typically, bookmakers accept bets that do not introduce an unreasonable level of risk for them up until the start of the race or even slightly thereafter. However, bookmakers have difficulty managing large transactions late in the process because the bets can upset their book or introduce an unreasonable level of risk for them. This can cause a bookmaker to reject such a bet. Bookmakers can shut their book on a particular race or simply refuse a specific bet for any reason.

In contrast, regulated pools must accept all bets up until a closing time (e.g., post time, two minutes prior to the start of the race, etc.). Typically, the closing time of a regulated pool is at some time prior to the start of the race. Therefore, a player can be closed out of a regulated pool prior to the start of a race.

It is therefore an object of the invention to provide improved interactive wagering systems and methods.

It is a further object of the invention to provide the user with the ability to place a wager in a fixed-odds book or a pari-mutuel pool.

It is a further object of the invention to provide conditional fixed-odds and pari-mutuel wagering.

SUMMARY OF THE INVENTION

These and other objects of the invention are accomplished in accordance with the principles of the present invention by providing systems and methods for providing the user with the ability to place a wager in a fixed-odds book or a pari-mutuel pool using an interactive wagering application. For example, the interactive wagering application may provide the user with the ability to select whether to place a wager in a fixed-odds book or a pari-mutuel pool. The interactive wagering application may also provide the user with the ability to select a conditional wagering option.

As part of creating a wager, the interactive wagering application may provide the user with the ability to select whether to place the wager in a fixed-odds book or a pari-mutuel pool. Depending on the user's selection, the interactive wagering application may submit the wager into the appropriate book or pool.

The present invention may provide a conditional wagering option that may be selected by the user in connection with a fixed-odds wager or a pari-mutuel wager. When the user selects a conditional wagering option, the interactive wagering application may automatically submit the wager to an alternative wager option (e.g., a fixed-odds book or a pari-mutuel pool) if the wager is rejected by the user's selected wager option.

The present invention may notify the user of the status of the wager that submitted to the user's selected wager option or to the alternative wager option. For example, the interactive wagering application may notify the user when a wager has been accepted by a fixed-odds book or a pari-mutuel pool, rejected by a fixed-odds book or pari-mutuel pool, accepted by an alternative fixed-odds book or pari-mutuel pool, or rejected by an alternative fixed-odds book or pari-mutuel pool. The user may be notified by information displayed in an overlay, by e-mail, or by any other suitable method.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
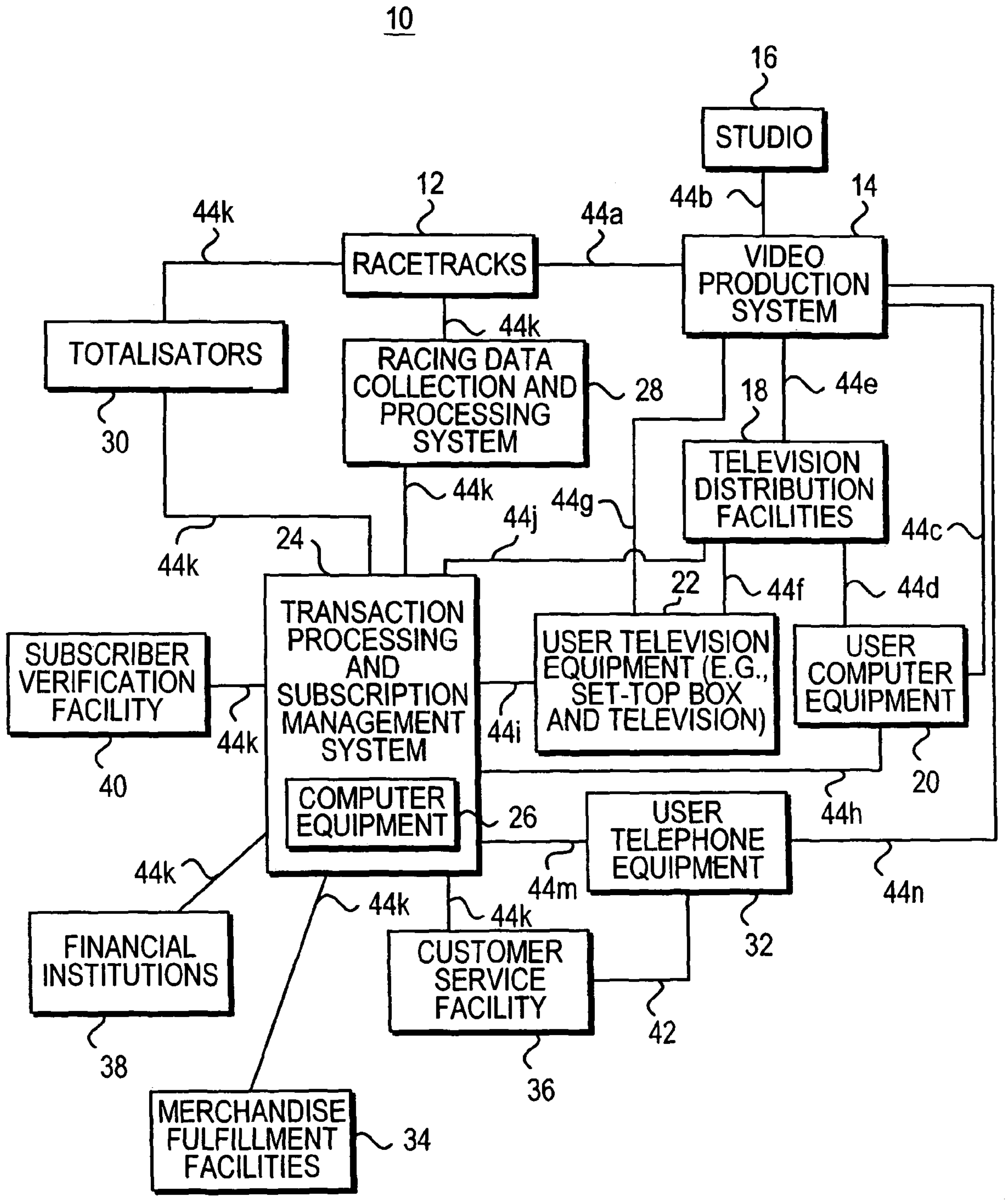
FIG. 1 is a schematic diagram of an illustrative interactive wagering system in accordance with one embodiment of the present invention.

An illustrative interactive wagering system 10 in accordance with the present invention is shown in FIG. 1. Aspects of the invention apply to various different types of wagering, but are described herein primarily in the context of interactive wagering on races (e.g., horse races) for specificity and clarity.

Races may be run at racetracks 12 that may be located at various geographic locations. Races run at racetracks 12 may be simulcast to viewers via television, personal computer, wireless device or any other suitable device. Such devices may be capable of receiving and displaying video via links such as cable, broadband, satellite, or any other suitable link.

Interactive wagering system 10 may be used to provide an interactive wagering service to users of various user equipment. An interactive wagering application may be used to provide users with the ability to use the interactive wagering service. In one suitable approach, the interactive wagering application may run locally on user equipment. User equipment may include a set-top box, a personal computer, a cellular telephone, a handheld computing device, or any other suitable device. In another suitable approach, the interactive wagering application may run using a client-server or distributed architecture where a portion of the interactive wagering application may be implemented locally on the user equipment in the form of, for example, a client process. Another portion of the interactive wagering application may be implemented at a remote location, such as on a server or any other suitable equipment as, for example, a server process. These arrangements are merely illustrative. Any other suitable arrangement for implementing the interactive wagering application may be used.

Real-time videos from racetracks 12 may be provided to video production system 14 for distribution to users as part of an interactive television wagering service. For example, the videos may be provided via a wagering-related television channel, via an Internet-delivered service, or via any other suitable technique. In one suitable approach, multiple simulcast videos may be provided to video production system 14 in real-time. Talent (e.g., commentators) may be provided by the interactive television wagering service using, for example, studio 16. Studio 16 may provide a video feed including commentary and the like to video production system 14. Graphic overlays for the television wagering service may be added to the service at video production system 14.

The interactive television wagering service may use video production system 14 to combine selected video segments from desired racing simulcasts with the video feed from studio 16 and suitable graphic overlays. In one suitable approach, video production system 14 or a separate facility may be used to reformat simulcasts from racetracks 12. For example, if racetracks 12 provide simulcasts as traditional analog television channels, video production system 14 (or a separate facility) may convert these simulcasts or portions of these simulcasts into digital signals (e.g., digital video signals) or into a different number of analog signals. Digital video signals may require less bandwidth than analog video signals and may be appropriate for situations in which videos are to be transmitted over either high or low bandwidth pathways. Low bandwidth pathways may include telephone lines, the Internet, or any other suitable pathway.

Video production system 14 may be used to provide an interactive television wagering service that may include selected simulcast videos from racetracks, video from studio 16, and graphic overlays to television distribution facilities 18 (for redistribution to user television equipment 22 and user computer equipment 20), to user computer equipment 20, and to user telephone equipment 32 (if user telephone equipment 32 has a display capable of displaying moving images). Television distribution facilities 18 may be any suitable, facilities for supplying television to users, such as cable system headends, satellite systems, broadcast television systems, or other suitable systems or combinations of such systems. User computer equipment 20 may be any suitable computer equipment that supports an interactive wagering application. For example, user computer equipment 20 may be a personal computer. User computer equipment 20 may be based on a mainframe computer, a workstation, a networked computer or computers, a laptop computer, a notebook computer, a handheld computing device such as a personal digital assistant or other small portable computer, or any other suitable equipment.

Each of television distribution facilities 18 is typically located at a different geographic location. Users with user television equipment 22 may receive the interactive television wagering service from an associated television distribution facility. User television equipment 22 may include, for example, a television or other suitable monitor. A television may be used to watch the interactive television wagering service on a traditional analog television channel. User television equipment 22 may include a digital or analog set-top box connected to a television distribution facility 18 by, for example, a cable path. A digital set-top box may be used to receive the interactive television wagering service on a digital channel. In one suitable approach, user television equipment 22 may contain a satellite receiver, a WebTV® box, a personal computer television (PC/TV), or hardware similar to such devices into which set-top box capabilities have been integrated. A recording device such as a videocassette recorder or digital recording device (e.g., a personal video recorder (PVR) or digital video recorder (DVR) based on hard disk drives or the like) may be used in user television equipment 22 to store videos. The recording device may be separate from or part of the other components of user television equipment 22.

Figure 2:
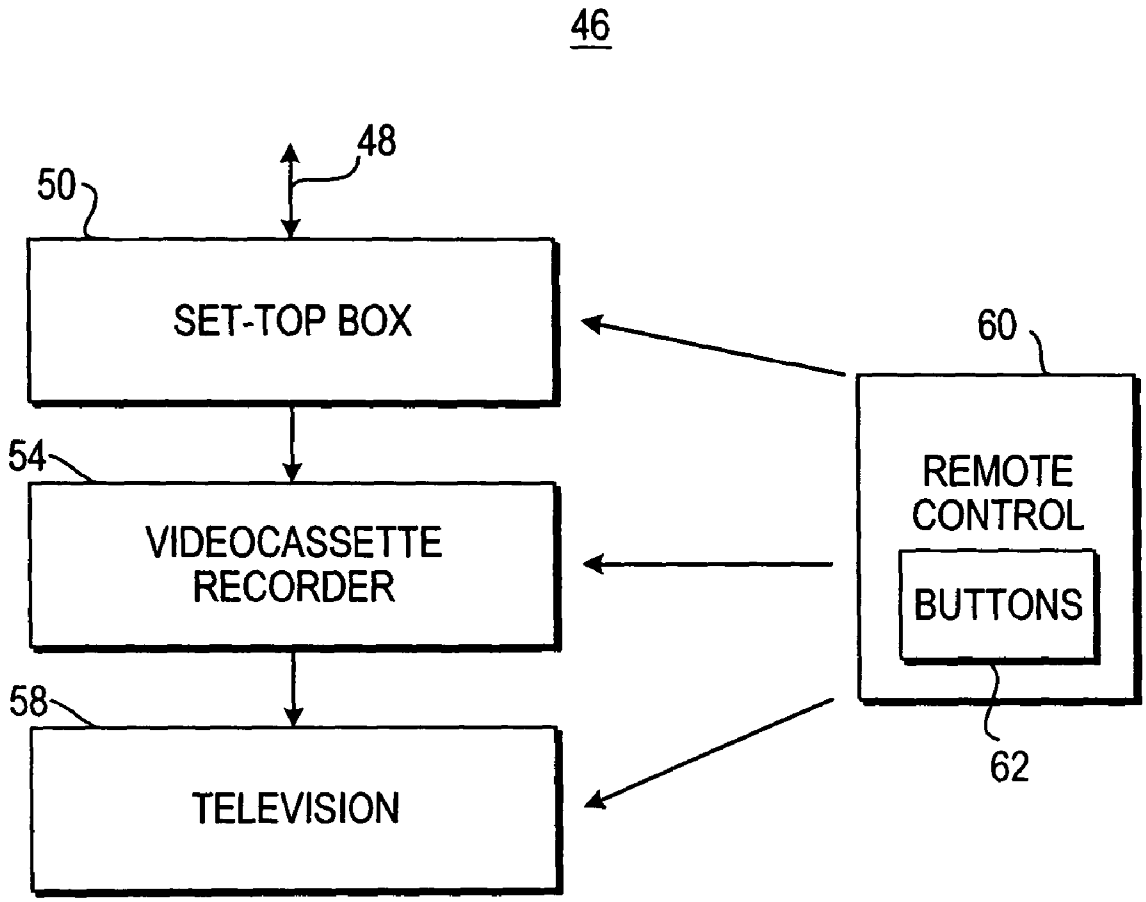
FIG. 2 is a schematic diagram of illustrative user television equipment in accordance with one embodiment of the present invention.

Illustrative user television equipment 46 is shown in FIG. 2. Set-top box 50 may receive television programming and data at input 48. Set-top box 50 may have analog and digital television tuning circuitry for handling analog and digital television signals. Television signals may be passed to videocassette recorder 54, that may be separate from the hardware (i.e., set-top box 50) that implements the interactive television wagering application, for recording. Set-top box 50 may control the operation of videocassette recorder 54. For example, set-top box 50 may issue infrared commands that are received by videocassette recorder 54 at the same inputs at which standard remote control commands are received.

Videocassette recorder 54 may be connected to television 58. Television programming and graphic display screens generated by applications implemented using set-top box 50 may be passed from set-top box 50 to television 58 through videocassette recorder 54.

Set-top box 50 may include memory and processing circuitry. This may allow set-top box 50 to be used to implement applications that support an interactive wagering application, interactive television wagering service, interactive television program guide, web browsing and Internet access, other services such as home shopping, home banking, and video-on-demand services, or any other suitable service.

A remote control 60 such as an infrared remote control may be used to control set-top box 50, videocassette recorder 54, and television 58. Remote control 60 may have buttons 62 such as a power button, right, left, up, and down arrow keys, an OK or select key, a favorites or fav key, a lock or parental control key, and any other suitable key.

Figure 3:
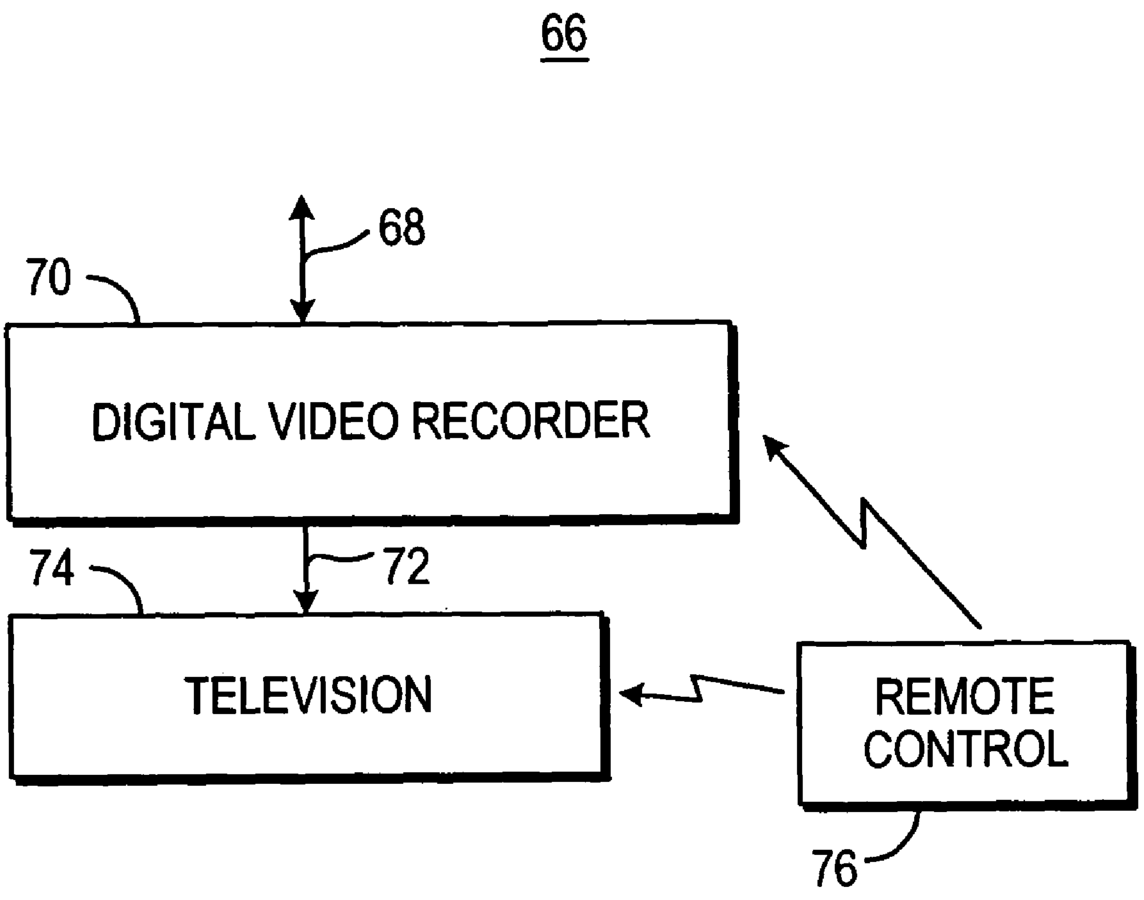
FIG. 3 is a schematic diagram of additional illustrative user television equipment in accordance with one embodiment of the present invention.

Illustrative user television equipment 66 based on a digital video recorder 70 is shown in FIG. 3. Digital video recorder 70 may receive television programming and may access interactive services using input 68. Digital video recorder 70 may have analog and digital tuning circuitry to receive and process television signals. Digital video recorder 70 may be used to record television programs in any suitable format. For example, digital videos may be stored using the MPEG-2 format.

Recorded videos or real-time videos from input 72 may be displayed on television 74 or any other suitable monitor. A remote control 76 such as an infrared remote control may be used to control digital video recorder 70 and television 74. Remote control 76 may have buttons such as a power button, right, left, up, and down arrow keys, an OK or select key, a favorites or fav key, a lock or parental control key, and any other suitable key.

Digital video recorder 70 has memory and processing circuitry that may allow digital video recorder 70 to be used to implement applications that support an interactive wagering application, interactive television wagering service, interactive television program guide, web browsing and Internet access, other services such as home shopping, home banking, and video-on-demand services, or any other suitable service. Television programming and display screens generated by interactive applications may be displayed on television 74.

Referring back to FIG. 1, user computer equipment 20 may receive the interactive television wagering service using a video card or any other suitable video-capable equipment to receive analog or digital (e.g., moving picture experts group or MPEG) videos from a television distribution facility 18. User computer equipment 20 may receive the interactive television wagering service directly from video production system 14 using, for example, a modem link. In one suitable approach, the video for the interactive television wagering service may be compressed, for example, using MPEG techniques. This may be useful, for example, if the path to user computer equipment 20 is a modem connection using telephone links. If video production system 14 is only used to serve user computer equipment 20 without traditional analog television capabilities, video production system 14 may only need to supply such digitally-compressed video signals and not analog television signals.

Figure 4:
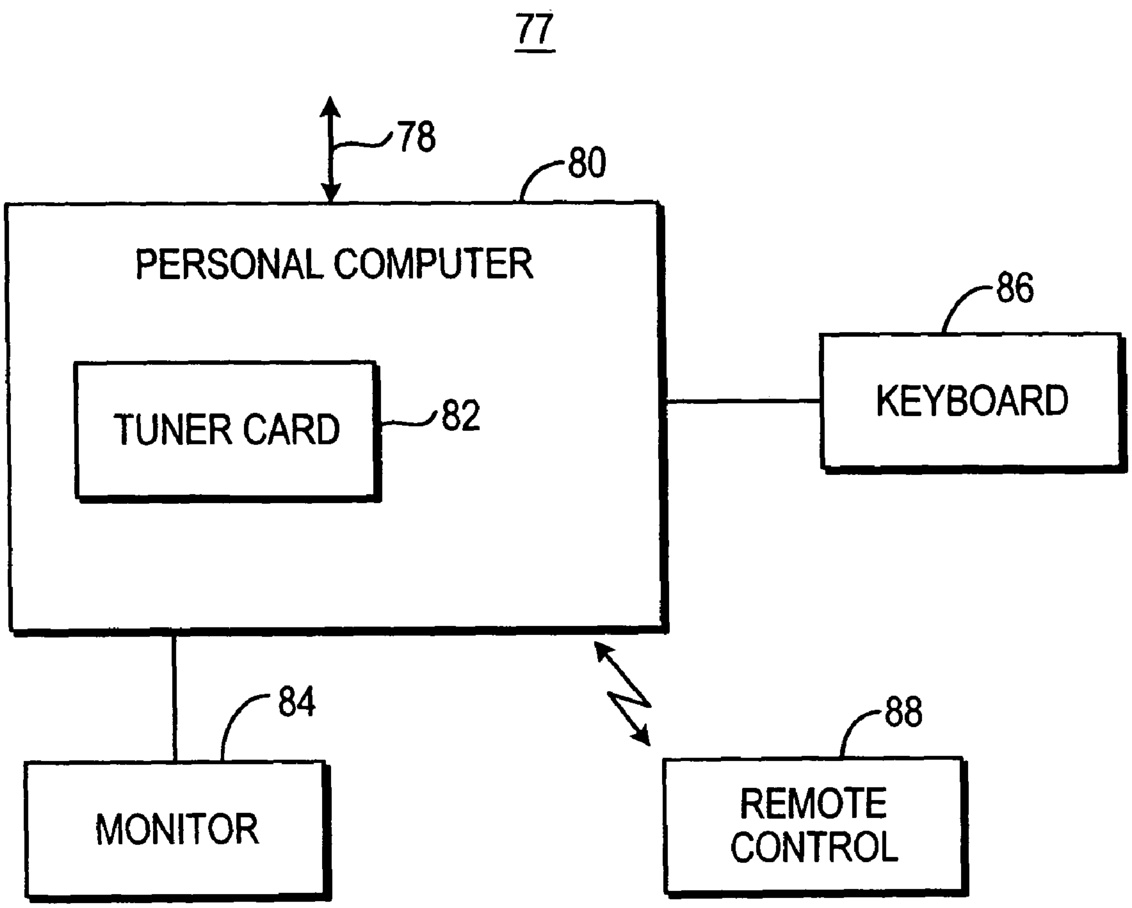
FIG. 4 is a schematic diagram of illustrative user computer equipment in accordance with one embodiment of the present invention.

Illustrative user computer equipment 77 is shown in FIG. 4. User computer equipment 77 may be based on a personal computer 80 or any other suitable computing device. Personal computer 80 may receive television programming and information for interactive services using input 78. Personal computer 80 may contain a tuner card 82 or any other suitable circuitry for handling analog and digital television signals. Personal computer 80 may contain memory and processing circuitry that may allow personal computer 80 to be used to implement applications that support an interactive wagering application, interactive television wagering service, interactive television program guide, web browsing and Internet access, other services such as home shopping, home banking, video-on-demand services, or any other suitable service. Personal computer 80 may contain a storage device such as a hard disk drive to store videos. Television signals and screens generated by interactive applications may be displayed on monitor 84.

The user may interact with personal computer 80 using any suitable user input interface, such as keyboard 86, a pointing device such as a trackball, mouse, or touch pad, a voice recognition system, a handwriting recognition system, or any other suitable user input interface. In one suitable approach, the user may interact with personal computer 80 using a wireless remote control such as remote control 88. Remote control 88 may be, for example, an infrared remote control.

Referring back to FIG. 1, video clips of races and other simulcast information may be provided to users in the form of an interactive television wagering service or by an interactive wagering service provided by the interactive wagering application. In one suitable approach, race-related videos may be provided to the user by using video production system 14 or any other suitable equipment to route appropriate video clips from the simulcasts to the user in real-time. Video clips may be stored for later viewing. For example, one or more video servers located at racetracks 12, video production system 14, television distribution facilities 18, or at any other suitable location may be used to store video clips. The stored videos may then be played-back in real-time or downloaded for viewing at user television equipment 22, user computer equipment 20, or user telephone equipment 32. The video clips may contain videos of races, commentary, interviews with jockeys, or any other suitable race-related information. In one suitable approach, real-time or stored videos may be provided from racetracks 12 directly to user television equipment 22, user computer equipment 20, or user telephone equipment 32 over the Internet or via any other suitable communications paths without involving video production system 14. Videos may be provided by routing video signals through equipment located elsewhere in interactive wagering system 10. For example, videos may be routed through transaction processing and subscription management system 24.

Transaction processing and subscription management system 24 may contain computer equipment 26 and other equipment for supporting system functions such as transaction processing (e.g., handling tasks related to wagers, product purchasing, adjusting the amount of funds in user accounts based on the outcomes of wagers, video clip ordering, or any other suitable task), data distribution (e.g., for distributing racing data to the users), and subscriber management (e.g., features related to opening an account for a user, closing an account, allowing a user to add or withdraw funds from an account, debiting an account, crediting an account, changing the user's address or personal identification number, or any other suitable feature). Databases within transaction processing and subscription management system 24 or associated with system 24 may be used to store racing data, wagering data and other transaction data, and subscriber data such as information on the user's current account balance, past wagering history, individual wager limits, personal identification number, billing addresses, credit card numbers, bank account numbers, social security numbers, or any other suitable information. Using such databases may allow the user to access information more quickly and may allow for central administration of the interactive wagering service.

In one suitable approach, racing videos and other services may be provided using servers and other equipment located at transaction processing and subscription management system 24. For example, video clips may be provided to the user on-demand. Interactive advertisements may be provided to the user. When the user selects a desired advertisement, transaction processing and subscription management system 24 may provide additional information or other services related to the advertisement to the user.

Product ordering services may be implemented using computer equipment 26 at transaction processing and subscriber management system 24 to handle orders and to assist in adjusting the appropriate account of the user accordingly. Orders may be fulfilled using merchandise fulfillment facilities 34. Merchandise fulfillment facilities 34 may be operated solely to provide merchandise fulfillment or may be associated with independently-operated mail-order or on-line businesses. Similar facilities may be used to allow users to order services.

Statistical racing data such as the post times for each race, jockey names, runner names and the number of races associated with each track, weather conditions at various tracks, and handicapping information, for example, information on past performances such as the number of wins and losses for each horse in the past year, or any other suitable information, may be provided by racing data collection and processing system 28. Some of the data may be collected from racetracks 12 and some may be provided by third party information sources such as Equibase Company, L.L.C. of Lexington, Ky. or by any other suitable data sources.

Racing data may be provided from totalisators 30. Totalisators 30 are the computer systems that may be used to handle pari-mutuel wagers made at the racetracks, made at off-track betting establishments, and made using interactive wagering system 10. Totalisators 30 may place wagers into applicable pari-mutuel wagering pools. Totalisators 30 generate wagering odds in real time. Totalisators 30 generate these odds based on information on which wagers are being placed, for example, based on information on which wagers are being placed on races at racetracks 12. Totalisators 30 are available from companies such as Amtote International, Inc. of Hunt Valley, Md. Totalisators 30 may be associated with individual racetracks 12 or groups of racetracks 12. Totalisators 30 may communicate with one another using a communication protocol known as the Intertote Track System Protocol (ITSP). This allows totalisators 30 to share wagering pools. Totalisators 30 may provide racing data including information on the current races at racetracks 12, the number of races associated with each racetrack, win, place, and show odds and pool totals for each horse or other runner, and exacta, trifecta, and quinella payoff predictions and pool totals for every possible combination of runners. Totalisators 30 may provide current odds and other real-time racing data for other types of wagers. Totalisators 30 may provide the time until post time and the time until the pari-mutuel pool closes for each race.

Totalisators 30 may also handle wagers such as fixed-odds wagers. Totalisators 30 may place wagers int applicable fixed-odds books. When a user places a fixed-odds wager, the odds for that wager are fixed and cannot change. Totalisators 30 may update the current odds for fixed-odds-wagering when an internal book is balanced to minimize risk to the bookmakers. Totalisators 30 may provide the current odds for fixed-odds win wagers, show wagers, place wagers, exacta wagers, trifecta wagers, and any other suitable fixed-odds wager types for every possible combination of winners. In another suitable embodiment, computer systems separate from totalisators 30 may be used to handle fixed-odds wagering. For example, fixed-odds wagers may be routed to any one of a number of established and reputable bookmakers.

Totalisators 30 may provide race results, such as the order-of-finish list for at least the first three positions and payoff values versus a standard wager amount for win, place, and show, for each runner in the finish list. Payoff values may be provided for winning complex wager types such as exacta, trifecta, quinella, pick-n (where n is the number of races involved in the pick-n wager), and daily double. The payoff values may be accompanied by a synopsis of the associated finish list. The payoff values are typically for pari-mutuel wagers because the payoff values are the same for everyone who placed a pari-mutuel wager.

Totalisators 30 may provide program information of the type typically provided in printed racing programs. Such program information may include early odds, early scratches, race descriptions (including the distance of each race and the race surface—grass, dirt, artificial turf, or any other suitable surface), allowed class ratings (based on a fixed ratio of external criteria), purse value (payoff to winning runner), allowed age range of runners, and the allowed number of wins and starts for each runner.

In one suitable approach, some of the information provided to transaction processing and subscription management system 24 by totalisators 30, such as the program information or other suitable racing data, may be provided by racing data collection and processing system 28. Similarly, some of the information provided to transaction processing and subscription management system 24 by racing data collection and processing system 28 may be provided by totalisators 30. The foregoing examples of different suitable types of racing data are merely illustrative. Any other suitable types of data related to racing may be provided to transaction processing and subscription management system 24.

Transaction processing and subscription management system 24 may provide the racing data to users at user television equipment 22, user computer equipment 20, and user telephone equipment 32 for use in following race results and the corresponding wager results, and developing wagers. In one suitable approach, racing data may be provided to users using paths that do not directly involve transaction processing and subscription management system 24. For example, racing data may be provided from racing data collection and processing system 28 to user television equipment 22, user computer equipment 20, or user telephone equipment 32 using the Internet or other suitable communications paths.

User telephone equipment 32 may be a conventional telephone, a cordless telephone, a cellular telephone or other portable wireless telephone, or any other suitable telephone equipment. Users at user television equipment 22 and user computer equipment 20 may view information on the racing data on a television or other suitable monitor. Users at user telephone equipment 32 may listen to racing data using an interactive voice system. User telephone equipment 32 may be based on cellular telephones with displays. Users may view racing data displayed on such displays.

Figure 5:
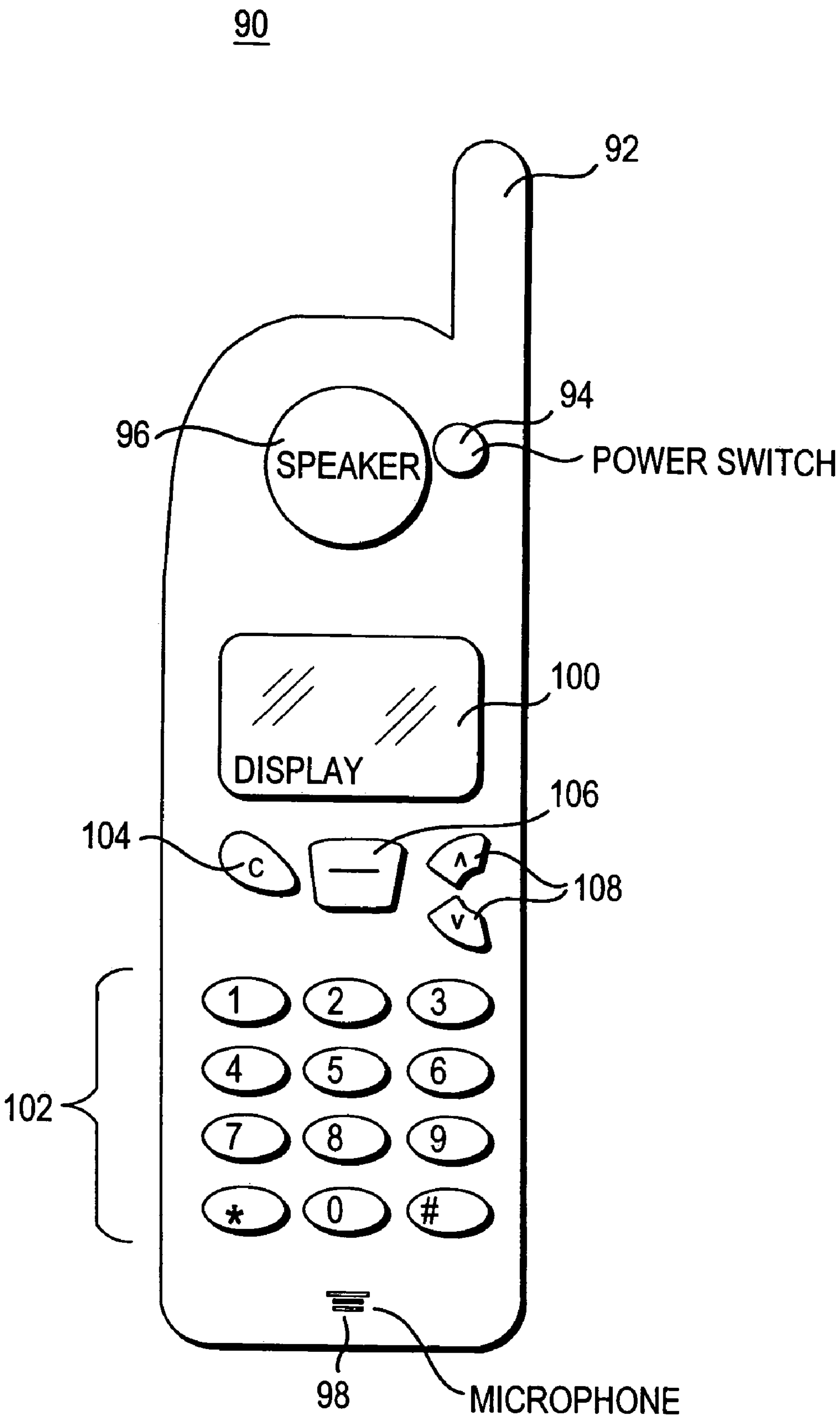
FIG. 5 is a diagram of an illustrative user cellular telephone equipment in accordance with one embodiment of the present invention.

An illustrative cellular telephone 90 with which the user may use the interactive wagering application is shown in FIG. 5. A portion of the software that is used to implement the interactive wagering service may be resident on cellular telephone 90. Cellular telephone 90 may have a recording device for storing software instructions and videos. Cellular telephone 90 may also have a processor for executing the instructions and displaying the videos.

Cellular telephone 90 may have an antenna 92 to support wireless communications with transaction processing and subscription management system 24, customer service facility 36, or video production system 14, as shown in FIG. 1. A power switch 94 may be used to turn cellular telephone 90 on and off. A speaker 96 may allow the user to listen to conversations and to listen to audio prompts from, for example, transaction processing and subscription management system 24, as shown in FIG. 1. A microphone 98 may allow the user to converse with others. Display 100 may be a liquid crystal display (black and white or color), a plasma display, a light-emitting diode display, an active matrix display, or any other suitable type of small display screen. Keys 102 may allow the user to enter-inputs. Numeric keys 102, including the star and pound key, may allow the user to respond to interactive voice response system prompts, such as "press 3 to select race 3," and may allow the user to enter numbers to select numerically identified on-screen menu options and the like that are displayed on display 100. In one suitable approach, some of the numeric keys 102 may perform secondary functions if, for example, they are pressed and held for at least a predetermined length of time. Clear key 104 may be used to clear characters from display 100. If the user presses and holds clear key 104, the user may be taken back to the initial screen displayed on display 100 upon power up. Navigation key 106 may be used to access menus, make telephone calls, or perform any other suitable function. Scroll keys 108 may be used to scroll through menus and to scroll through other items presented on display screen 100.

Figure 6:
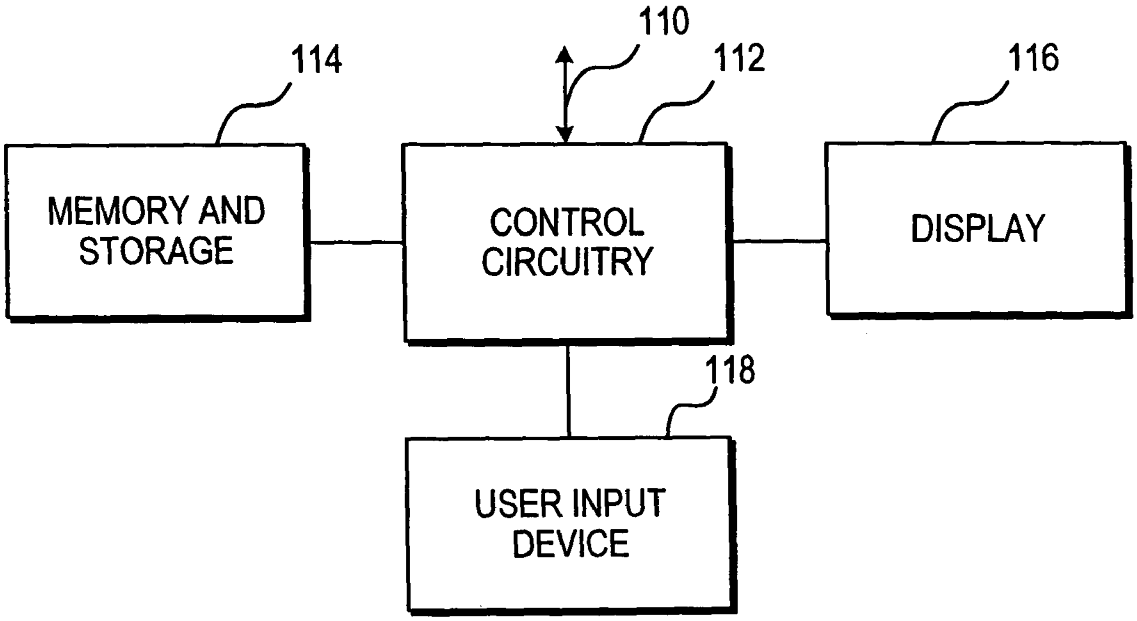
FIG. 6 is a schematic diagram of illustrative user equipment in accordance with one embodiment of the present invention.

A generalized schematic diagram of user equipment, such as user television equipment 22, user computer equipment 20, and user telephone equipment 32 of FIG. 1, is shown in FIG. 6. Control circuitry 112 and memory and storage 114 may have communications, memory, and processing circuitry suitable for supporting functions such as receiving television programming, recording videos in storage, and accessing interactive services over line 110. Line 110 may be coupled to communications paths such as paths 42, 44*c*, 44*d*, 44*f-i*, 44*m*, and 44*n* of FIG. 1. Television programming and text, graphics, and video associated with interactive services may be presented to the user using display 116. Display 116 may be a television, a computer monitor, or any other suitable display equipment.

The user may interact with control circuitry 112 using any suitable user input device 118, such as a remote control, a keyboard, a wireless keyboard, a display remote, a handheld computer, a mouse, a trackball, a touch pad, or any other suitable input device.

Referring back to FIG. 1, users who wish to place wagers may establish an account at transaction processing and subscription management system 24. An account may be established at one of totalisators 30. The user and the interactive wagering services provider may have their own bank accounts at financial institutions 38. A user may set up an account electronically by using user television equipment 22, user computer equipment 20, or user telephone equipment 32 to interact with the subscriber management functions of transaction processing and subscription management system 24. In one suitable approach, accounts may be established with the interactive wagering service with the assistance of customer service representatives at customer service facility 36. Customer service facility 36 may be at the same location as transaction processing and subscription management system 24, may be a part of system 24, or may be located remote from system 24. Customer service representatives at customer service facility 36 may be reached by telephone. If user telephone equipment 32 is used to access the interactive wagering service, for example, user telephone equipment 32 may be used to reach the customer service representative using communications path 42. If user television equipment 22 or user computer equipment 20 is being used with the interactive wagering service, a telephone at the same location as that equipment may be used to reach the customer service representative.

The user's identity may be checked using social security number information or other identification information with the assistance of subscriber verification facility 40. The services of subscriber verification facility 40 are used to ensure that the user lives in a geographic area in which wagering is legal, that the user is of a legal age, and that the identification information, for example, the user's social security number, matches the name provided by the user. If the user is using a cellular telephone or handheld computing device, the user's present physical location may be determined by determining which general part of the cellular telephone network is being accessed by the user. In another suitable approach, the user's present physical location may be determined by using the cellular network or a handset-based location device, such as a global positioning system (GPS) receiver in the body of the cellular telephone, to pinpoint the user's location. This location information may be used to verify that the user is located in a geographic area where wagering is legal.

In a typical enrollment process, the user may provide personal information to the interactive wagering service and provide funds with a credit card or funds from the user's bank account. The interactive wagering service may set up an account for the user at transaction processing and subscription management system 24 and may direct one of totalisators 30 to set up a new account for the user at the totalisator. The totalisator may be directed to credit the user's account to reflect the amount of funds provided by the user. After the user places a wager and wins or loses, the totalisator may adjust the user's totalisator account to reflect the outcome of the wager. The totalisator may periodically inform the interactive wagering service of the adjusted balance in the user's account. This may be accomplished using any suitable technique, for example, periodically, continuously, on-request, or by any other suitable technique. In one suitable approach, reports may be collected periodically, for example, once a day in an end-of-day report, and provided to the interactive wagering service to reconcile the account balances at transaction processing and subscription management system 24 with the account balances at totalisators 30.

If the user makes a balance-inquiry, the inquiry may be passed to the appropriate totalisator by transaction processing and subscription management system 24. If the user is charged a fee for subscribing to the service, the service may debit the fee from the user's account at the transaction processing and subscription management system 24.

The accounts at totalisators 30 and transaction processing and subscription management system 24 may be maintained separately because the business entities that operate totalisators 30 and transaction processing and subscription management system 24 are independent. In one suitable approach, financial functions related to opening and maintaining user accounts and the like may be handled using computer equipment at another location, such as one of financial institutions 38 or any other suitable location remote from totalisators 30 and transaction processing and subscription management system 24. In another suitable approach, such financial functions may be implemented primarily at a totalisator 30 or primarily at the transaction processing and subscription management system 24.

Users at user television equipment 22, user computer equipment 20, and user telephone equipment 32 may place wagers by providing wagering data and by otherwise interacting with transaction processing and subscription management system 24. The interactive wagering service may provide a user at user television equipment 22, user computer equipment 20, or user telephone equipment 32 that has display capabilities with screens containing various racing data. For example, the user may be presented with screens that allow the user to view the current odds for horses in an upcoming race at a given track.

The interactive wagering service may provide the user with interactive screens containing menus and selectable options that allow the user to specify the type of wager in which the user is interested and the desired wager amount. With a set-top box arrangement, for example, the user may use a remote control or wireless keyboard to navigate the various menus and selectable options. With a personal computer, the user may use a keyboard, mouse, trackball, touch pad, or other suitable input or pointing device. With a cellular telephone with a display, the user may use buttons on the telephone. When the user has made appropriate selections to define a desired wager, user television equipment 22, user computer equipment 20, or user telephone equipment 32 may transmit wagering data for the wager to transaction processing and subscription management system 24.

Users with telephones may interact with the interactive wagering service using an interactive voice response system or an automated touch-tone keypad system located at transaction processing and subscription management system 24. The interactive voice response system or automated touch-tone keypad system may present menu options to the user in the form of audio prompts, for example, "press 1 to select a $2 wager amount" or any other suitable audio prompt. The user may interact with the interactive wagering service by pressing the corresponding buttons on a touch-tone telephone. User telephone equipment 32 that is based on cellular telephones may allow the user to interact with the interactive wagering service in this way. User telephone equipment 32 that is based on cellular telephones with messaging and display capabilities may allow the user to interact visually with the interactive wagering service.

The components of interactive wagering system 10 may be interconnected using various communications paths 44. Communications paths 44 may include satellite paths, coaxial cable paths, fiber-optic paths, twisted pair paths, other wire or cable-based links, modems, wireless paths through free space, or any other suitable paths or combination of such paths. Communications over paths 44 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packet-based transmissions, television channel transmissions, transmissions in the vertical blanking interval (VBI) of a television channel or on a television sideband, MPEG transmissions, or any other suitable type of transmissions. Communications may involve wireless pager or other messaging transmissions. Communications paths 44 may include cable connected to cable modems, digital subscriber lines, integrated services digital network (ISDN) lines, or any other suitable paths. Examples of suitable communications paths are described below. Those examples are merely illustrative. Any of the communications path arrangements described above or other suitable arrangements may be used.

Communications paths that carry video and particularly uncompressed analog video, lightly-compressed digital video, or full-screen digital video generally use more bandwidth than communications paths that carry only data or that carry partial-screen digital video. For example, to transmit high-quality simulcasts of races from racetracks 12 to video production system 14, analog or digital videos may be transmitted from racetracks 12 to video production system 14 over path 44*a* using satellite links. Video may be transmitted from studio 16 to video production system 14 over path 44*b* using a satellite link or a high-speed terrestrial path such as a fiber-optic path. Studio 16 may be located at the same site as video production system 14, thereby avoiding the need for a long-haul transmission path. Videos may be transmitted from video production system 14 to user computer equipment 20 over path 44*c* using a modem link that uses, for example, a digital subscriber line, a telephone network link, a wireless link, or any other suitable link. The modem link may be made over a private network.

A user with a cable modem may connect a personal computer or other such user computer equipment 20 to an associated cable system headend using, for example, path 44*d*. The headend in such an arrangement would be one of the television distribution facilities 18 shown in FIG. 1. The user may then receive videos from the headend via cable modem. Videos may be provided to the headend over path 44*e* using a network link, fiber optic links, cable links, microwave links, satellite links, or any other suitable link. A user with a set-top box or similar device, shown in FIG. 1 as user television equipment 22, may receive videos from a cable system headend using a cable modem or other such communications device over path 44*f*. A user with user television equipment 22 may receive videos over the Internet or a private network using a telephone-based modem or other such communications device using path 44*g*. In a system with distributed processing, interactive wagering services may be provided using a television distribution facility 18 that includes equipment that supplements or replaces at least some of the equipment at transaction processing and subscription management system 24.

In one suitable approach, user television equipment 22 or user computer equipment 20 may receive analog or digital videos from an associated television distribution facility over the communications paths normally used to distribute television programming, such as paths 44*f* and 44*d*, respectively. For example, videos may be received as part of a dedicated interactive wagering service television channel. If videos are provided as digital signals, for example, as MPEG signals, 10 or more digital videos may be carried on a single analog channel. In another suitable approach, one digital video may be carried on one-tenth of the bandwidth of an analog channel. If the videos are not full-screen videos, even more videos may be simultaneously provided without a loss of image quality.

Racing videos may be provided to user telephone equipment 32 over a telephone Internet link or any other suitable telephone link using path 44*n*.

In one suitable approach, racing data may accompany the racing videos along any of these paths. Racing videos may be provided by routing them directly from racetracks 12 to user television equipment 22, user computer equipment 20 (e.g., over the Internet or a private network, or any other suitable network), or user telephone equipment 32. Racing videos may be provided by routing them through transaction processing and subscription management system 24. If a cellular telephone, such as cellular telephone 90, or portable computing device has sufficient display capabilities to support moving images, racing videos may be displayed. Such videos may be provided using any suitable path, such as a direct path from racetracks 12, a path through video production system 14 or other suitable video processing equipment, through a hub such as transaction processing and subscription management system 24, or through any other suitable path. Racing videos may be provided in real-time or may be recorded for later distribution. In another suitable approach, videos that are not provided in real-time may be downloaded by user television equipment 22, user computer equipment 20, a cellular telephone, or any other suitable user equipment at a lower data rate than would otherwise be required and may be downloaded in the background. Such videos may be provided to the user at real-time video rates for direct viewing by the user.

Racing data and other information related to the interactive wagering service may be provided to users over paths connected to transaction processing and subscription management system 24. For example, racing data and other data for the interactive wagering service may be provided to user computer equipment 20 over path 44*h* using a modem link. Path 44*h* may be a private network path or an Internet path. Path 44*h* may use telephone lines, digital subscriber lines, ISDN lines, wireless data paths, or any other suitable type of communications links. User television equipment 22 may receive data for the interactive wagering service over communications path 44*i*, that may be a telephone line, digital subscriber line, ISDN line, or any other suitable type of communications path and which may use a private network path, an Internet path, or any other suitable path.

Data for the interactive wagering service may be provided to users of the interactive wagering application via communications path 44*j* and paths 44*f* and 44*d*. Communications path 44*j* may be provided over a private network, over a public telephone network, over satellite links, or over any other suitable type of links. In one suitable approach, data from paths such as path 44*j* may be routed to paths such as paths 44*f* and 44*d* directly by associated television distribution facilities 18. In another suitable approach, the data may be buffered at television distribution facilities 18. Paths 44*f* and 44*d* may include coaxial cable, and use of paths 44*f* and 44*d* may involve the use of cable modems or the like. If data is provided over path 44*j* and paths 44*f* or 44*d* using an Internet protocol, a web browser or similar software running on user television equipment 22 or user computer equipment 20 may be used to access the data. Such software may be integrated into the interactive wagering application or may be used separately. In another suitable approach, software may be used to view videos and may be used on other platforms, for example, advanced cellular telephones.

The communications paths 44*k* that are used to connect various other components of interactive wagering system 10 typically do not carry high-bandwidth video signals. Accordingly, paths 44*k* may be telephone-like paths that are part of the Internet or a private network. Such paths and various other paths 44 may be dedicated connections for security, reliability, and economy.

User telephone equipment 32 may receive information for the interactive wagering service via path 44*m*. If user telephone equipment 32 is a standard (non-cellular) telephone, such information may be in the form of audio prompts, such "press 1 to place a wager," and audio racing data, such as "the current win odds for horse 2 are 5-1." Transaction data processing and subscription management system 24 may contain interactive voice response equipment that provides such information to the user and that responds to touch-tone signals from the user when the user responds to prompts by pressing buttons on the user's telephone.

If user telephone equipment 32 is a cellular telephone, racing data and other information for the interactive wagering service may be provided to the user by using a cellular wireless connection as part of path 44*m*. Users with cellular telephones may be provided with audio prompts using an interactive voice response system located at transaction processing and subscription management system 24 to which the users may respond by pressing cellular telephone buttons to generate touch-tone signals.

Racing data and other information for the interactive wagering service may be provided to cellular telephones in the form of alphanumeric messages. Such messages may be transmitted to the user by using paging or other alphanumeric messaging formats or any other suitable data communications scheme. In one suitable approach, data may be provided to the cellular telephones over the voice channel and decoded by the cellular telephone using modem circuitry or other suitable circuitry. Data may be provided using any other suitable cellular or wireless path. Regardless of the way in which racing data and other information for the interactive wagering service are provided to the cellular telephone, such information may be provided to the user by displaying it on the cellular telephone display screen or by presenting it in audible form through the speaker of the cellular telephone.

Racing data and other interactive wagering service information for the users may be provided in one or more continuous data streams, may be provided periodically (e.g., once per hour or once per day), or may be provided using a client-server arrangement in which data is requested by a client processor (e.g., user television equipment 22, user computer equipment 20, user telephone equipment 32, or any other such equipment) from a server (e.g., a server implemented using computer equipment 26 at transaction processing and subscription management system 24 or computer equipment at another suitable location). Videos may be provided using any of these techniques.

A return communications path between the user and the interactive wagering service may be used to allow the user to place wagers and otherwise interact with the interactive wagering service. For example, a user with a standard telephone or a cellular telephone may interact with the interactive wagering service by pressing touch-tone keys on the telephone in response to audio prompts provided by an interactive voice response system at transaction processing and subscription management system 24. In one suitable approach, users may call customer service representatives at customer service facility 36 and place wagers with manual assistance. The user of a cellular telephone may interact with the interactive wagering service by selecting menu options and otherwise interacting with information displayed on the cellular telephone. When a selection is made, software implemented on the telephone may be used to assist the user in transmitting appropriate data, for example, wagering data, to the interactive wagering service. Such data may be transmitted using any suitable technique. For example, data may be transmitted using a wireless data link that is separate from the cellular voice channels. Data may be transmitted over the voice channel, for example, by using a modem built into the cellular telephone, by automatically generating touch-tone signals that may be recognized by the interactive voice response system at transaction processing and subscription management system 24, or using any other suitable arrangement. These approaches may be used even if the user receives racing data and other information for the interactive wagering service using a platform other than a telephone-based platform.

Users with user television equipment 22 may interact with the interactive wagering service by sending data, such as wager data, to transaction processing and subscription management system 24 using path 44*i* or using paths 44*f* and 44*j*. Users with user computer equipment 20 may send data, such as wager data, to transaction processing and subscription management system 24 via path 44*h* or paths 44*d* and 44*j*. Users at any user equipment may send data for the interactive wagering service to locations other than transaction processing and subscription management system 24. For example, the user may provide information directly to customer service facility 36, or any other suitable location.

In one suitable approach, interactive wagering system 10 may send data to the interactive wagering service at transaction processing and subscription management system 24 using different paths than those used to receive data from transaction processing and subscription management system 24. For example, racing data may be received at user television equipment 22 via paths 44*j* and 44*f*, whereas data may be sent by interactive wagering system 10 from user television equipment 22 to transaction processing and subscription management system 24 using path 44*i*, or any other suitable path. The paths used to receive certain video information may be different from those used to receive racing data. For example, user television equipment 22 may receive racing videos using path 44*f*, but may receive racing data using path 44*i*. These examples are merely illustrative. Any suitable combination of paths may be used to distribute racing data and other information for the interactive wagering service, any suitable combination of paths may be used to receive videos, and any suitable combination of paths may be used to send data to the interactive wagering service.

In one suitable approach, the user may be given the ability to interact with the interactive wagering service using more than one platform. For example, the user may be given the ability to place a wager using a cellular telephone while the user is driving home. When the user arrives home, the user may determine the outcome of the wager by watching a video of the race on user television equipment. Later in the day, the interactive wagering application may provide the user with the ability to check the user's account balance using a personal computer. This is merely an illustrative example. The various wagering platforms may be used in any suitable combination.

Interactive wagering system 10 has been described in the context of a system that supports multiple wagering platforms. In another suitable approach, interactive wagering system 10 may support fewer platforms. For example, aspects of the invention may be implemented using an interactive wagering system 10 that only supports cellular telephone wagering or wagering using handheld computer devices. In one suitable approach, interactive wagering system 10 may be configured so that it does not support personal computer wagering, wagering with standard telephones, or wagering with user television equipment. The system may support cellular telephones and/or handheld computing devices such as personal digital assistants, palm-sized computers, or any other suitable computing device, in combination with any other suitable platform.

The features of the present invention are sometimes described herein in the context of an interactive wagering application implemented on user television equipment. This is only illustrative. An interactive wagering application implemented on any suitable platform (user computer equipment, user telephone equipment, or any other suitable platform) may be used to provide such features. In computer arrangements, on-screen options may be selected by clicking on them using a mouse pointer or other pointing arrangement. In set-top box arrangements, on-screen options may be made larger than they appear in computer-based arrangements to accommodate the greater viewing distance from which televisions are typically operated. Options may be selected by highlighting them using remote control arrow keys and by pressing an appropriate key such as an OK or enter or select key. In cellular telephone arrangements and handheld computer arrangements, options and information may be displayed using smaller screens than are typically available on personal computer or set-top box arrangements. To accommodate the smaller screen size, options that might otherwise be presented on a single screen may be displayed using multiple screens or layered menus. Options may be selected by highlighting them using navigation keys and pressing an appropriate select button on the cellular telephone or handheld computing device or by using a pen-based interface or the like.

The interactive wagering application may be implemented using application software that runs primarily on user television equipment, user computer equipment, user telephone equipment, or other local platform or using a remote server or other computer that is accessed from the local platform. Arrangements in which interactive wagering services are implemented using software on remote computers that is accessed on-demand from local platforms may be referred to as client-server arrangements. Such client-server arrangements may be used to allow client processes on set-top boxes or other platforms to access server processes running on servers located at cable system headends or other television distribution facilities 18, as shown in FIG. 1. Regardless of the type of system architecture or platform used, the software that supports the interactive wagering service features described herein may be referred to as an interactive wagering application.

In a set-top box environment, the interactive wagering system may allow the user to launch the interactive wagering application by selecting a menu option in an interactive television program guide or other set-top box application or menu. In one suitable approach, the interactive wagering application may be launched automatically whenever the user tunes to a particular channel, for example, a wagering-related television channel. After the user has tuned to this channel, the interactive wagering system may display an interactive icon on the user's television screen that indicates that the interactive wagering application is available. If the user presses an "OK" remote control key, the interactive wagering system may launch the interactive wagering application.

In a computer-based system, the user may access the interactive wagering application by browsing to an Internet web site or a site on a private network.

Interactive wagering systems based on cellular telephones or the like may be launched by selecting an appropriate on-screen menu option presented on the display of the cellular telephone.

The present invention is directed to systems and methods for providing the user with the ability to place a wager in a fixed-odds book or a pari-mutuel pool using an interactive wagering application: As part of creating a wager, the interactive wagering application of the present invention may provide the user with the ability to select wager options for the wager and the ability to designate a conditional wagering option. For example, a user may create a wager for a specific race and designate that the wager is to be submitted to a fixed-odds book. The interactive wagering application may submit the wager to the fixed-odds book. If the wager is rejected by the fixed-odds book, the interactive wagering application may automatically submit the wager to a pari-mutuel pool if the user designated the wager as a conditional wager.

As context for the present invention, a brief description showing one possible example of a wager creation is provided. Referring now to FIGS. 7-13, one possible way to create a wager suitable for use with the systems and methods of the present invention is described.

Figure 7:
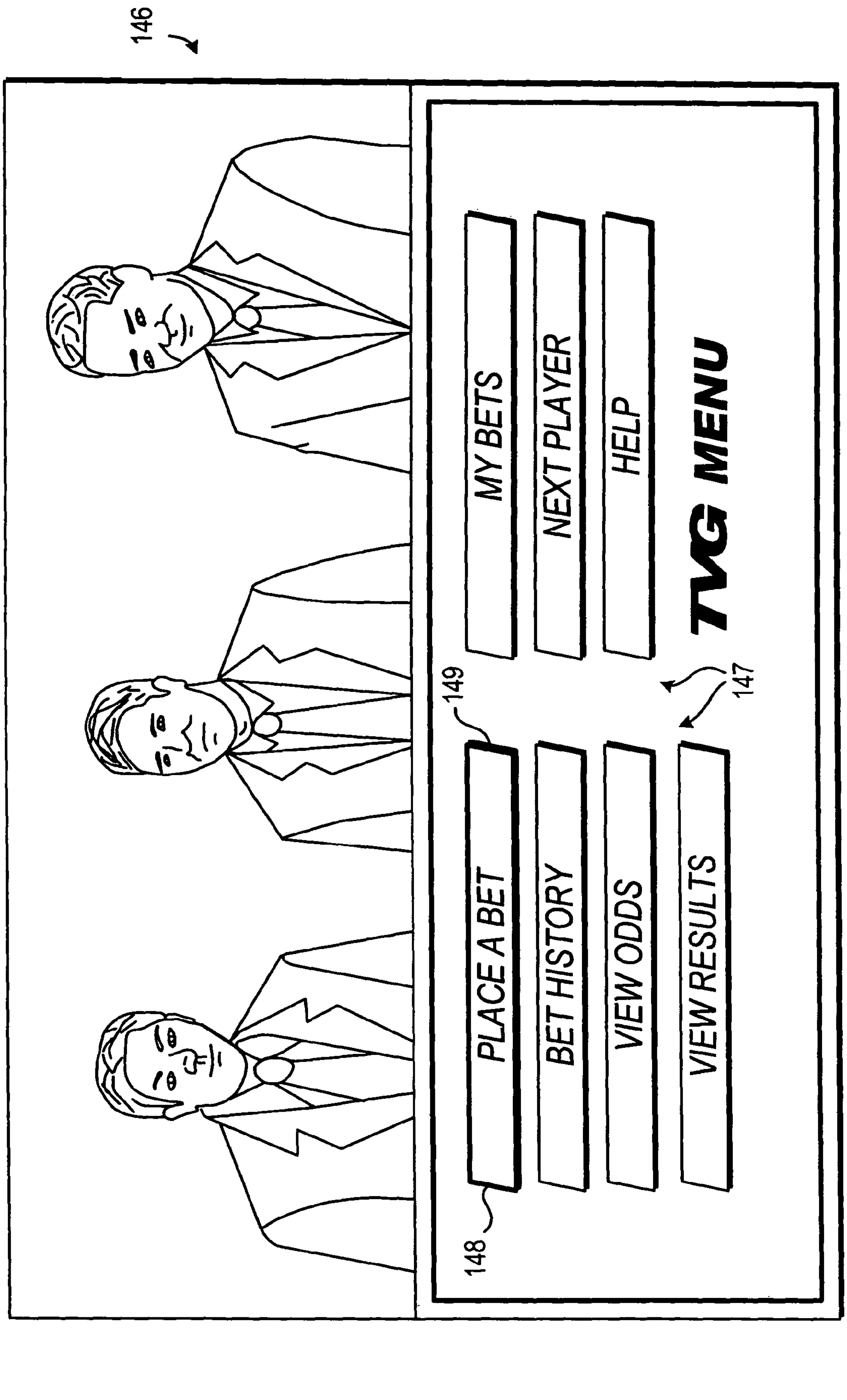
FIGS. 7-13 show illustrative screens for creating a wager suitable for use with the systems and methods of the present invention.

An illustrative menu screen 146 that may be provided by an interactive wagering application is shown in FIG. 7. Screen 146 and the screens shown in FIGS. 8-12 are examples of screens that may be displayed on a satellite receiver set-top box or other user television equipment 22. In another suitable approach, the format and contents of such screens may be modified to accommodate different platforms such as user computer equipment platforms (e.g., user computer equipment 20) and user telephone equipment platforms (e.g., user telephone equipment 32). The information and options of the screens of FIGS. 7-12 may be provided using audio prompts to accommodate telephone-based wagering from touch-tone telephones.

As shown in FIG. 7, menu screen 146 may include a number of different options 147. For example, options may be provided to place a bet, to view a bet history, to view handicapping information such as odds, to view race results, to view a list of the user's wagers, to move to the next player (when multiple players are wagering at a single session), or to obtain help. Screen 146 may be displayed as an overlay on top of a wagering-related television channel, as shown, or as an overlay on top of any suitable video or application.

Figure 8:
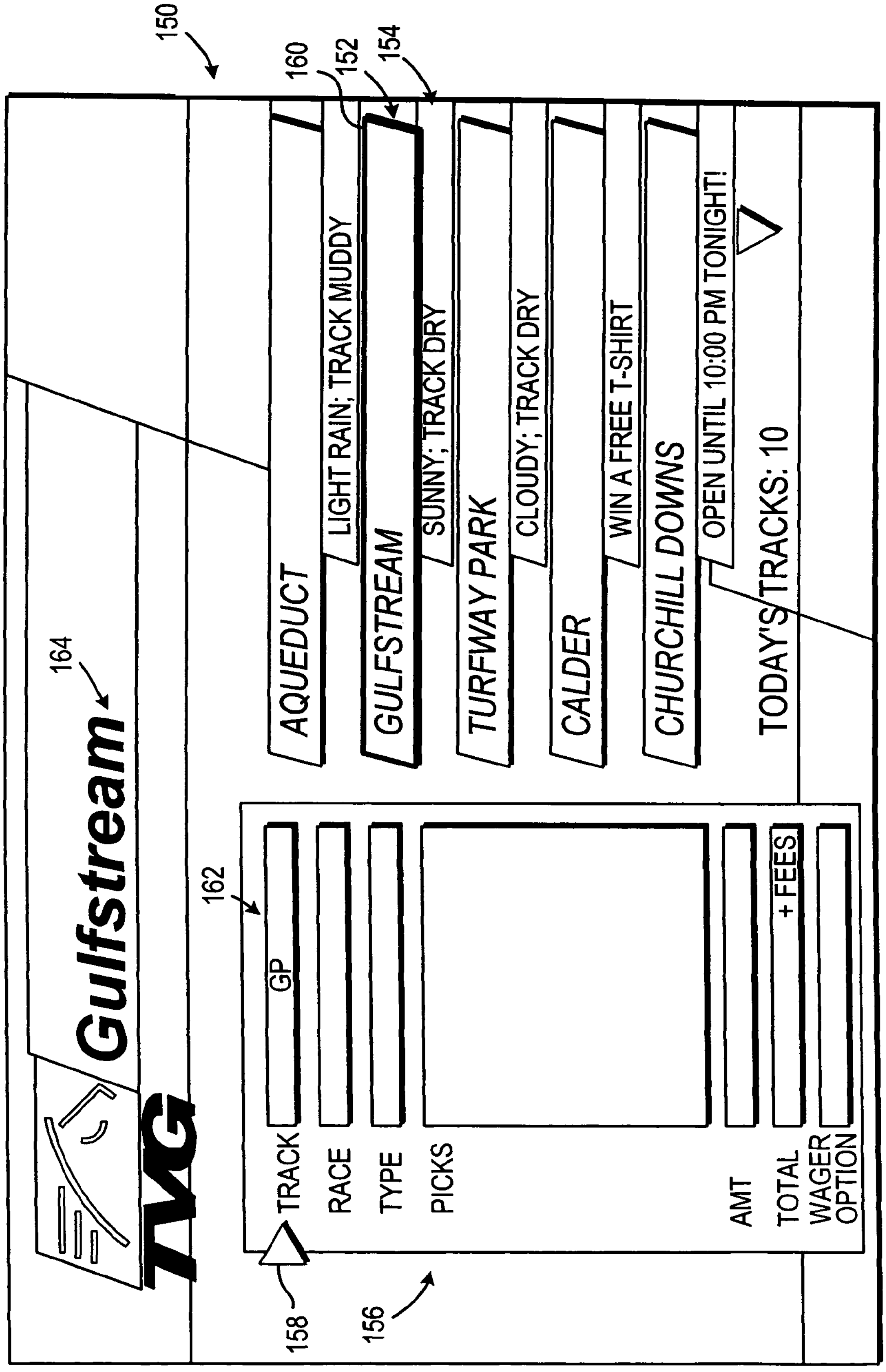

When the user selects place a bet option 149 of FIG. 7 by, for example, navigating highlight region 148 over place a bet option 149 and pressing an appropriate key on the remote control (e.g., OK key), the interactive wagering application may display a screen such as racetrack selection screen 150 of FIG. 8. As shown in FIG. 8, the racetrack name field for each selectable racetrack option has a corresponding information area. For example, racetrack name field 152 has a corresponding information area 154.

Screen 150 may contain a wagering ticket 156. Indicator 158 may be used to visually indicate which portion of the wagering ticket 156 is currently being filled in. In the example of FIG. 8, the user is selecting a desired racetrack for a wager. The interactive wagering application may give the user the ability to select desired racetracks using highlight region 160. As shown, the user has selected the Gulfstream track, with code 162 (i.e., GP).

Figure 9:
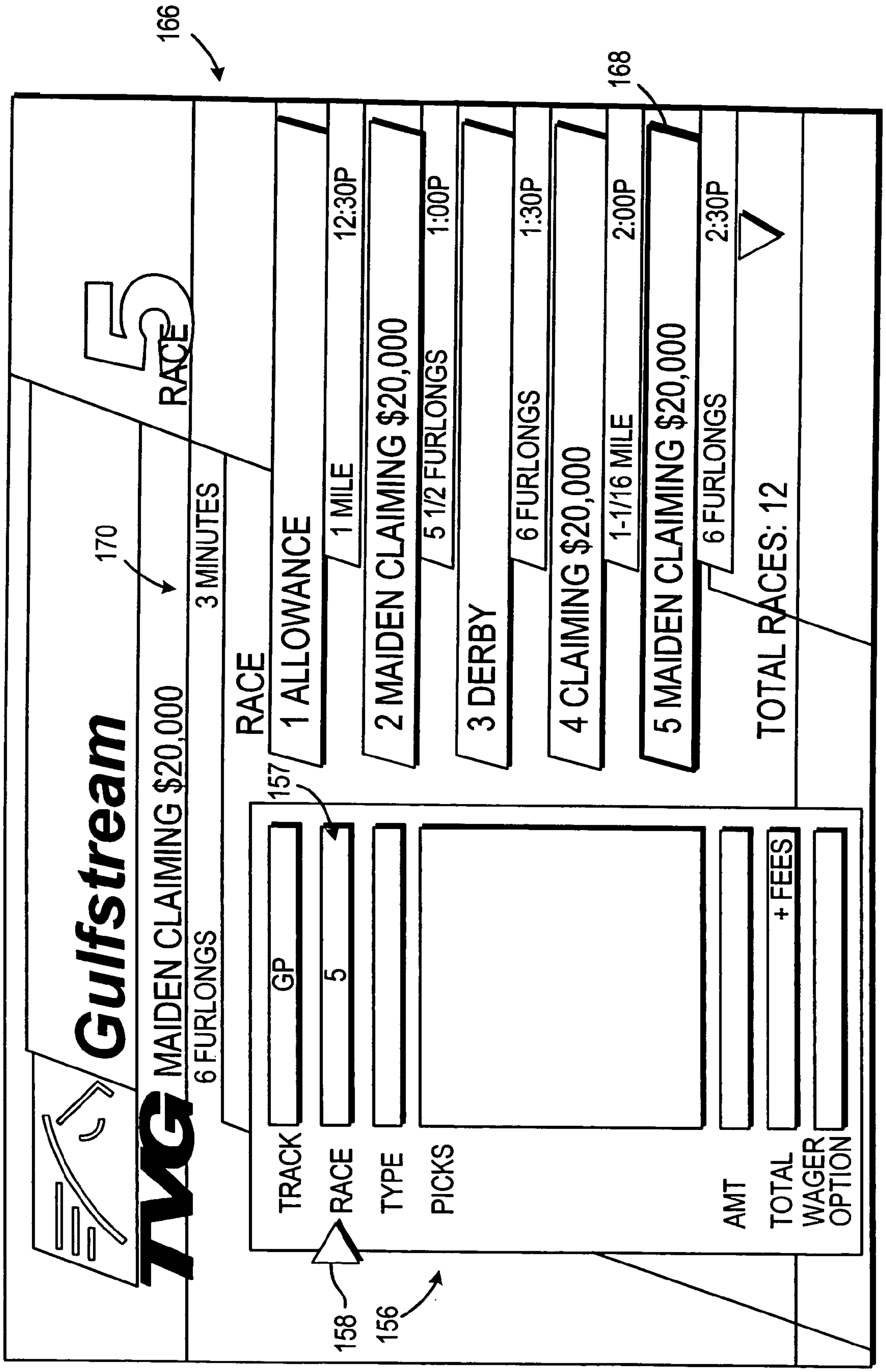

When the user selects a track, the interactive wagering application may present the user with a screen such as race selection screen 166 of FIG. 9. In screen 166, the user may be given the ability to move highlight region 168 over a desired selectable race option, such as race 5. When the user highlights a desired race, the race number may be added to ticket 156 in region 157, and indicator 158 may be positioned to make it clear that the user is selecting a race. Screen 166 may include a race indicator 170, which displays the status of the highlighted race. As illustrated, race indicator 170 indicates that there are 3 minutes to post for race 5.

Figure 10:
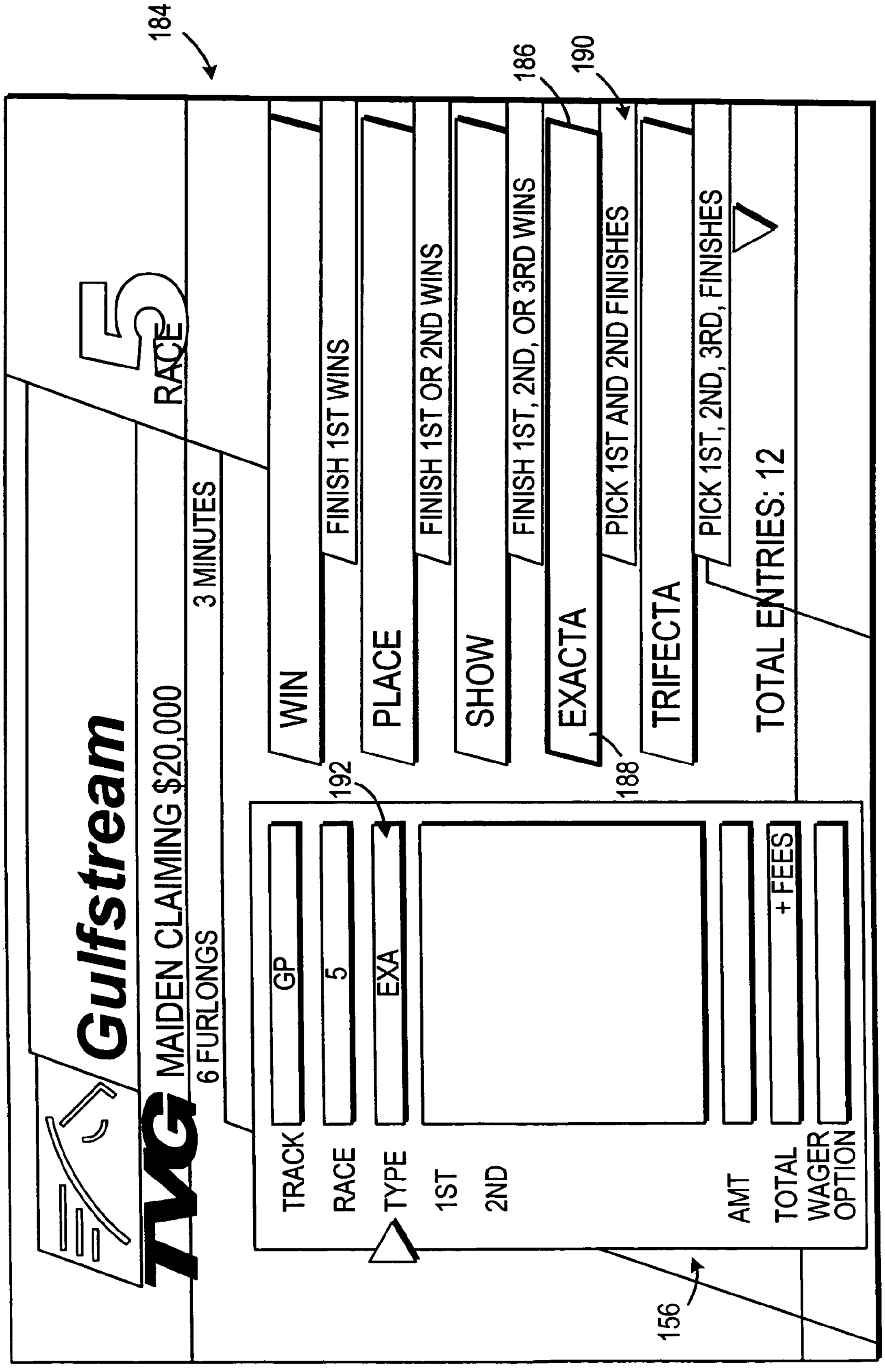

When the user selects a desired race, the interactive wagering application may display a wager type selection screen such as screen 184 of FIG. 10. The user may be given the ability to place highlight region 186 over a desired selectable wager type option, for example, win, place, show, exacta, trifecta, or any other suitable option. The wager types are listed in wager type fields such as wager type field 188. In the example of FIG. 10, wager type field 188 (i.e., exacta) has a corresponding information area 190. The information in information area 190 may be a wager type description for the corresponding wager type listed in wager type field 188. Wager ticket 156 may be updated to reflect the highlighted wager type (i.e., exacta). This information is displayed in region 192.

Figure 11:
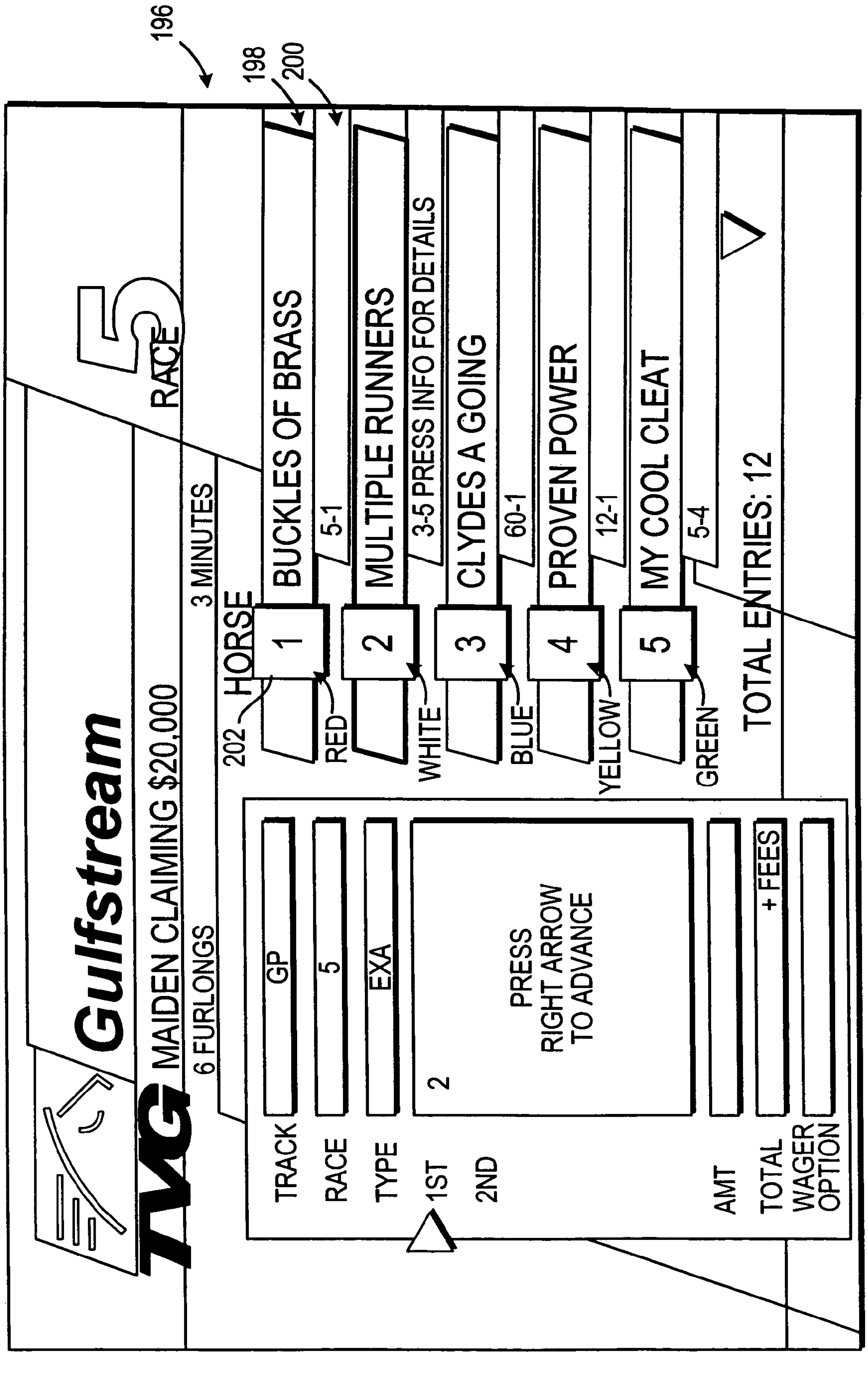

When the user selects the desired wager type, the interactive wagering application may display a horse selection screen such as screen 196 of FIG. 11. As shown in FIG. 11, the names of the horses are listed in selectable horse option name fields such as horse name field 198. Corresponding information areas such as information area 200 are used to display information such as the pari-mutuel win odds, the fixed-odds book win odds, both the current pari-mutuel win odds and the fixed-odds book win odds for each horse, or any other suitable odds. Horse numbers such as horse number 202 are provided adjacent to each horse name. As shown in FIG. 11, each horse number may be a different color.

Figure 12:
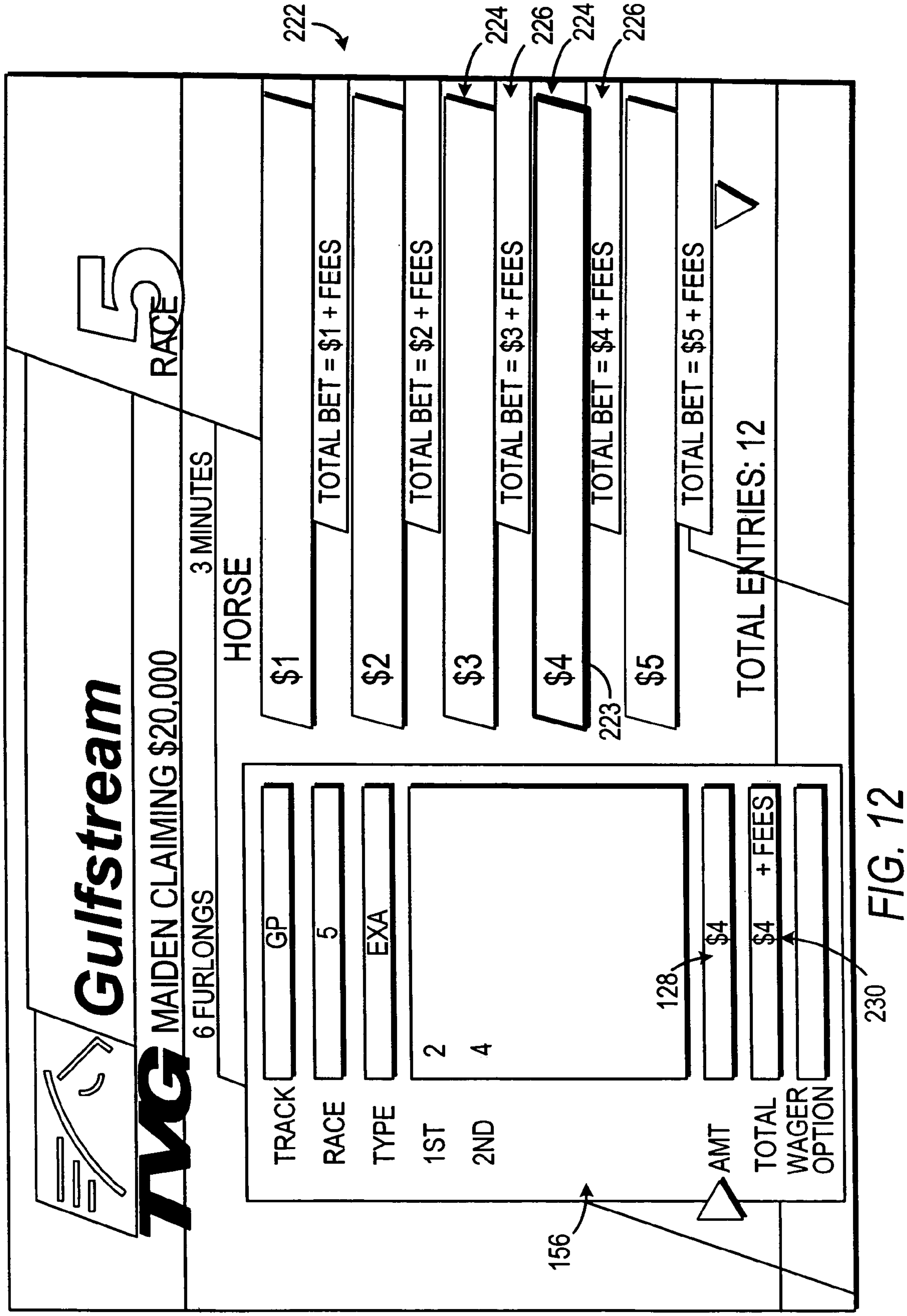

When the user has finished selecting horses, the interactive wagering application may give the user the ability to select a wager amount, as shown in screen 222 of FIG. 12. As shown in wager ticket 156, the user selected horse 2 to come in first and horses 1 to come in second. A highlight region 223 may be used to highlight a desired wager amount option. A number of wager amount fields 224 may be displayed, each containing a different wager amount. A corresponding information area 226 may be displayed for each wager amount field 224. In the arrangement of FIG. 12, each information area 226 displays the results of a calculation indicating how much the user's total wager would amount to after taking into account any multiple runner selection that the user has made. Wager amount 128 (i.e., $4) and total amount being wagered 230 (i.e., $4+fees) may be reflected in wagering ticket 156.

Figure 13:
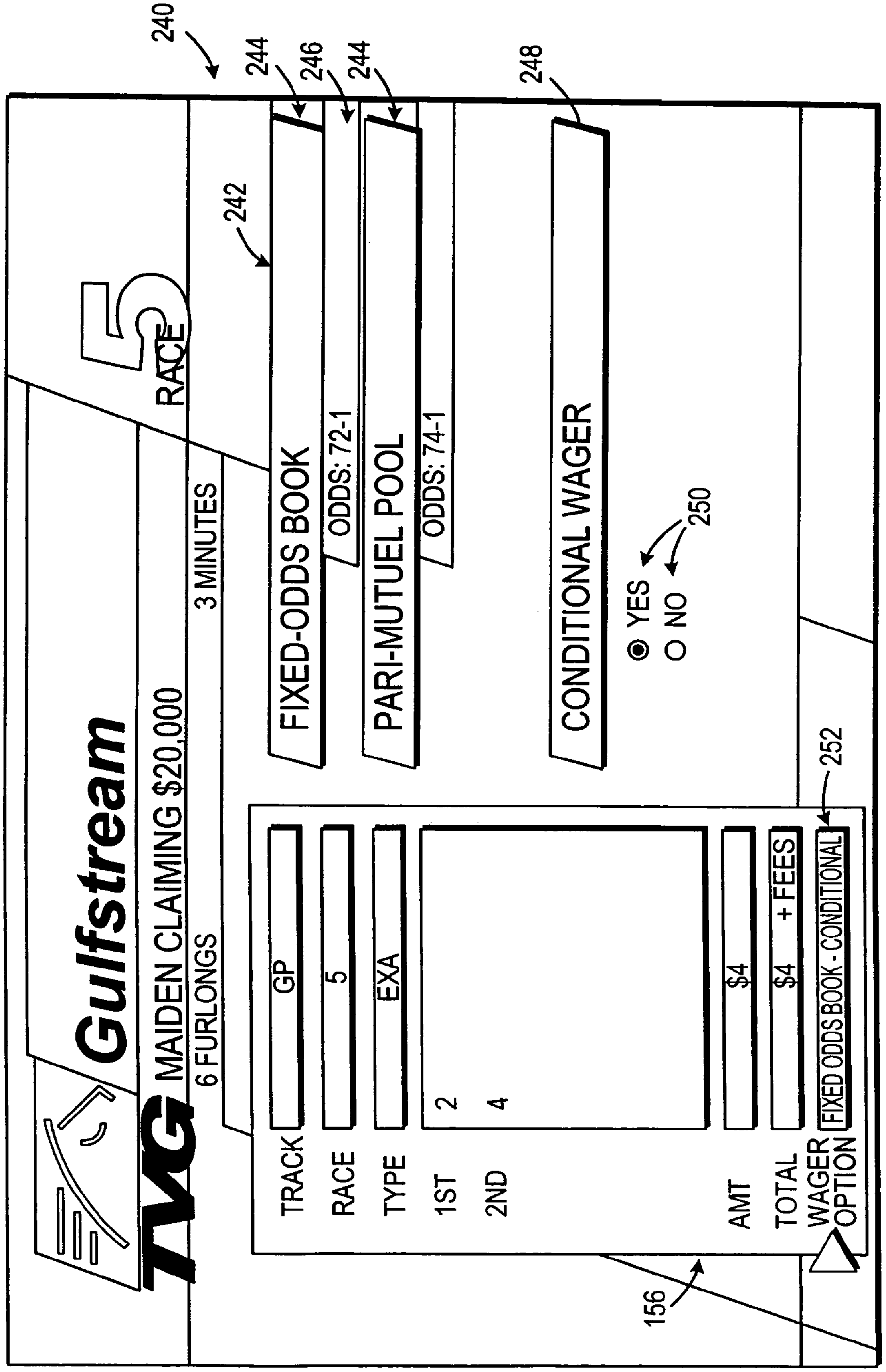

When the user has finished selecting the wager amount and total wager, the interactive wagering application may give the user the ability to select whether to place the wager in a fixed-odds book or a pari-mutuel pool as shown in screen 240 of FIG. 13. A highlight region 242 may be used to highlight the desired wager option. Wager option fields 244 may be displayed, each containing a different wager option. A corresponding information area 246 may be displayed for each wager option field 244. In the arrangement of FIG. 13, each information area 246 displays the current odds for the wager option. As shown, the fixed-odds book odds are 72-1 and the pari-mutuel odds are 74-1 for the exacta wager created by the user. By submitting the wager to the fixed-odds book, the odds will not change but there is a chance that the wager will not be accepted. By submitting the wager to the pari-mutuel pool, the wager will most likely be accepted, but the odds may change. The interactive wagering application may also provide the user with the ability to select a conditional wagering option, such as by toggling between choices 250 of conditional wager option 248. When the user selects a conditional fixed-odds book wager, if the wager is not accepted by the fixed-odds book, then the wager is submitted to a pari-mutuel pool. Likewise, when the user selects a conditional pari-mutuel pool wager, if the wager is not accepted by the pari-mutuel pool, then the wager is submitted to a fixed-odds book. Wager ticket 156 may be updated to reflect the highlighted wager option in wager option area 252. As shown in wagering ticket 156, the user has selected the track, race, wager type, horses, wager amount, and wager option, amounting to one example of creating a wager.

After a user has created a wager, for example, as described above in FIGS. 7-13, the interactive wagering application may provide the user with the ability to either submit the wager or refrain from submitting the wager. If the user chooses to submit the wager, the interactive wagering application may submit the wager to transaction processing and subscription management system 24 (FIG. 1), as shown in FIG. 1. When the user selects the fixed-odds book wager option, the transaction processing and subscription management system may submit the wager to a fixed-odds book. When the user has selects the pari-mutuel pool wager option, the transaction processing and subscription management system may submit the wager to a pari-mutuel pool. When the user has selects the conditional wager option, transaction processing and subscription management system 24 (FIG. 1) may automatically submit the wager to the other wager option if it is rejected from the user's selected wager option (i.e. if the fixed-odds book wager is rejected, for example because the wager will upset the bookkeeper's book, then transaction processing and subscription management system 24 (FIG. 1) will be notified that the wager was rejected and the transaction processing and subscription management system may then submit the wager into the pari-mutuel pool).

Figure 14:
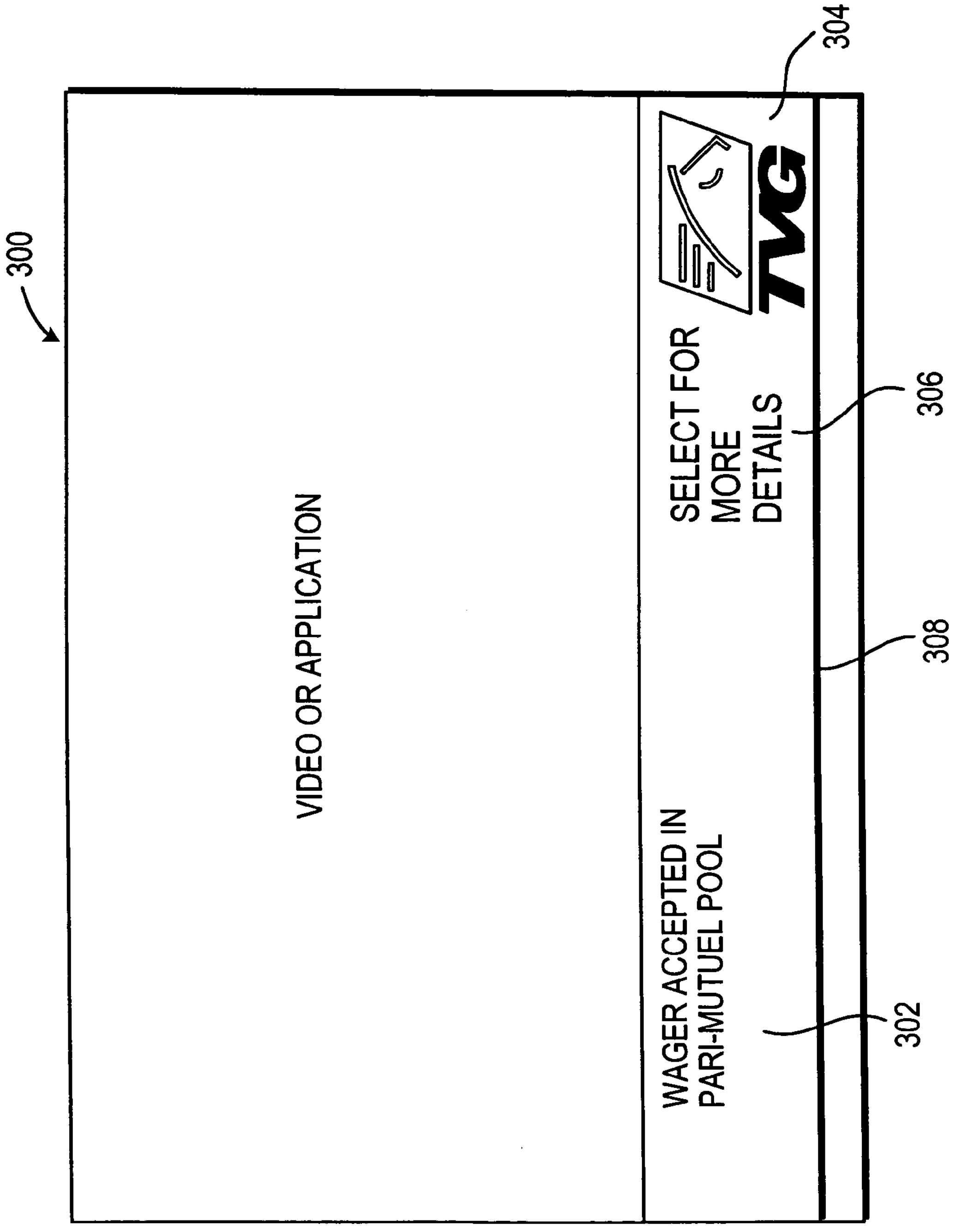
FIG. 14 shows an illustrative indicator display that may be provided as an overlay on top of a video or application in accordance with one embodiment of the present invention.

The interactive wagering application of the present invention may automatically provide the user with information related to the status of the submitted wager. FIG. 14 shows an illustrative screen 300 that may be provided after a user has created and submitted a wager. Screen 300 may include a video or application. Such a video or application may be related to the interactive wagering application. In another suitable approach, such a video or application may be unrelated to the interactive wagering application. After the wager has been submitted and accepted, indicator display 308 may be provided as an overlay on the video or application. An example of a system for implementing the automatic presentation of information on top of a television display is described, for example, in U.S. Pat. No. 6,157,413. Indicator display 308 may include informative message 302, directions 306, and provider logo 304.

Informative message 302 (i.e., Wager accepted in pari-mutuel pool) may inform the user that the wager has been accepted. Thus, the interactive wagering application may notify the user where the wager has been accepted using, for example, indicator display 308. Informative message 302 may be used by the interactive wagering application to inform the user that the wager was successfully placed in the user's selected wager option or the alternative wager option. In another suitable approach, informative message 302 may be used to inform the user that the wager was not successfully placed in the user's selected wager option or the alternative wager option. Directions 306 (i.e., Select for more details) may be included in screen 300 to inform the user that more information is available regarding a specific race. In the illustrated case, directions 306 are used by the interactive wagering application to inform the user that provider logo 304 may be selected to obtain more information on the race. In an interactive television wagering application, for example, the user may press the select button on a remote control, such as remote control 60 of FIG. 2 or remote control 76 of FIG. 3, to select provider logo 304. As a result, the interactive wagering application may provide the user with a screen (not shown) similar to those described in FIGS. 7-13 that may include information regarding the particular race.

In another suitable approach, when the user did not select the conditional wagering option and the wager was not accepted by the user's selected wager option, informative message 302 may be used to inform the user that the wager was not successfully placed and provide the user with the ability to submit the wager to the alternative wager option. For example, informative message 302 may display "Wager not accepted in fixed-odds book—Select here to submit wager to pari-mutuel pool." Information message 302 may also include the current odds for the alternative wager option and any other suitable information.

The screen shown in FIG. 14 is an example of a screen that may be displayed on a satellite receiver set-top box or other user television equipment 22 (FIG. 1), such as television 58 (FIG. 2) or television 74 (FIG. 3). The format and contents of such screens may be modified to accommodate different platforms, such as user computer equipment and user telephone equipment platforms. The information and options of the screen shown in FIG. 14 may be provided using audio prompts to accommodate telephone-based wagering from touch-tone telephones.

Figure 15:
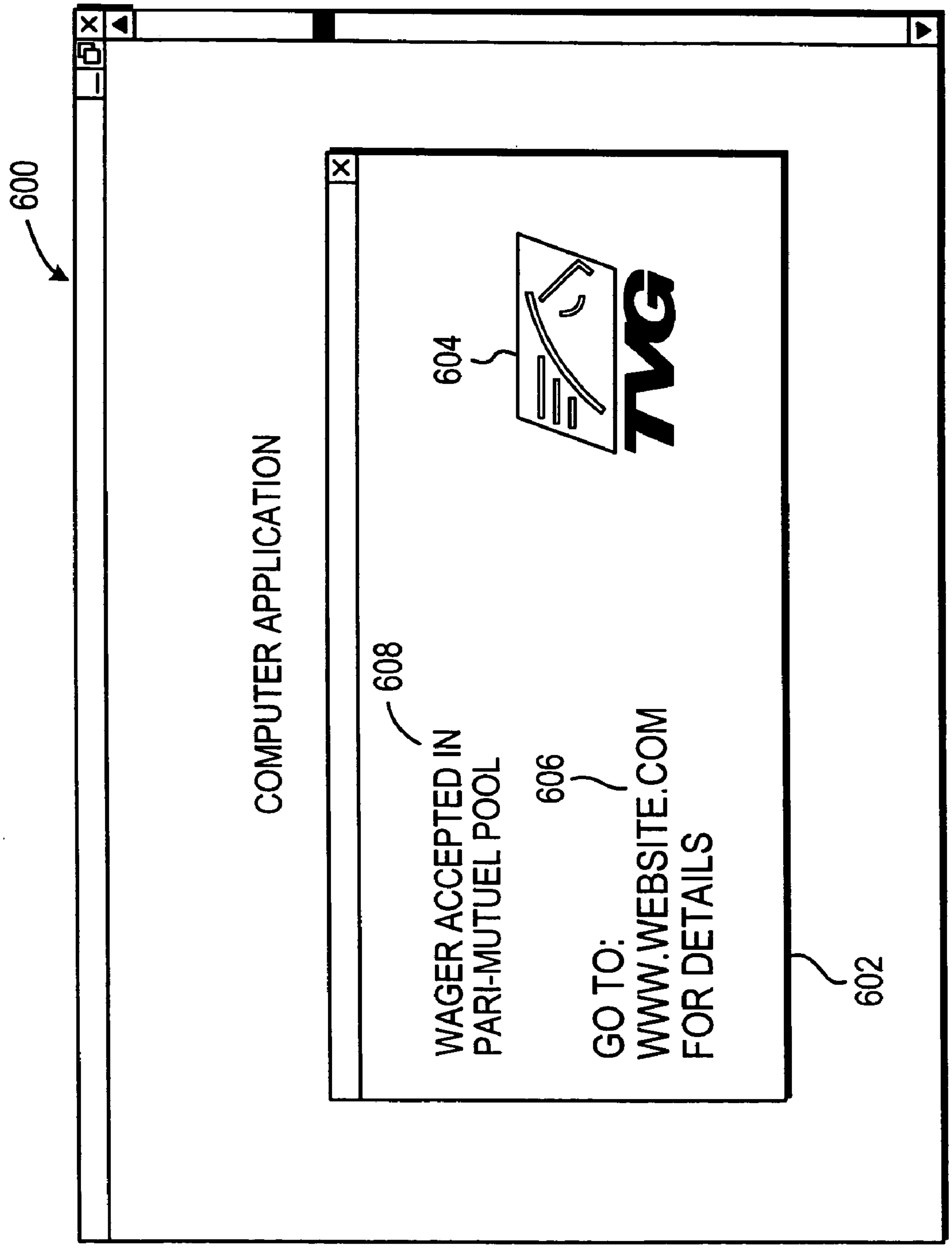
FIG. 15 shows an illustrative indicator window that may be provided as an overlay on top of a computer application in accordance with one embodiment of the present invention.

FIG. 15 shows an illustrative screen 600 that may be provided by an interactive wagering application implemented on user computer equipment. Such a screen may be provided on, for example, monitor 84 (FIG. 4). Screen 600 may be provided after a user has created and submitted a wager. Screen 600 may include a computer application. Such an application may be related to the interactive wagering application. In another suitable approach, the computer application may be unrelated to the interactive wagering application. After the user has created and submitted a wager, and the wager has been submitted and accepted, indicator window 602 may pop up over the computer application. Indicator window 602 may include informative message 608, link 606, and provider logo 604.

Informative message 608 may be used by the interactive wagering application to indicate to the user that the wager that the user created and submitted has been accepted. Thus, the interactive wagering application may automatically provide the user with this information in, for example, indicator window 602. Link 606 may be displayed in display screen 600 to indicate to the user that more information is available regarding the specific race. The user may select link 606 using, for example, a mouse, a keyboard (e.g., keyboard 86 of FIG. 4), or a remote control (e.g., remote control 88 of FIG. 4), to obtain more information on the outcome of the race. In the illustrated case, when the user selects link 606, the interactive wagering application may display a website having content similar to the content of the television screens described in FIGS. 7-13.

Figure 16:
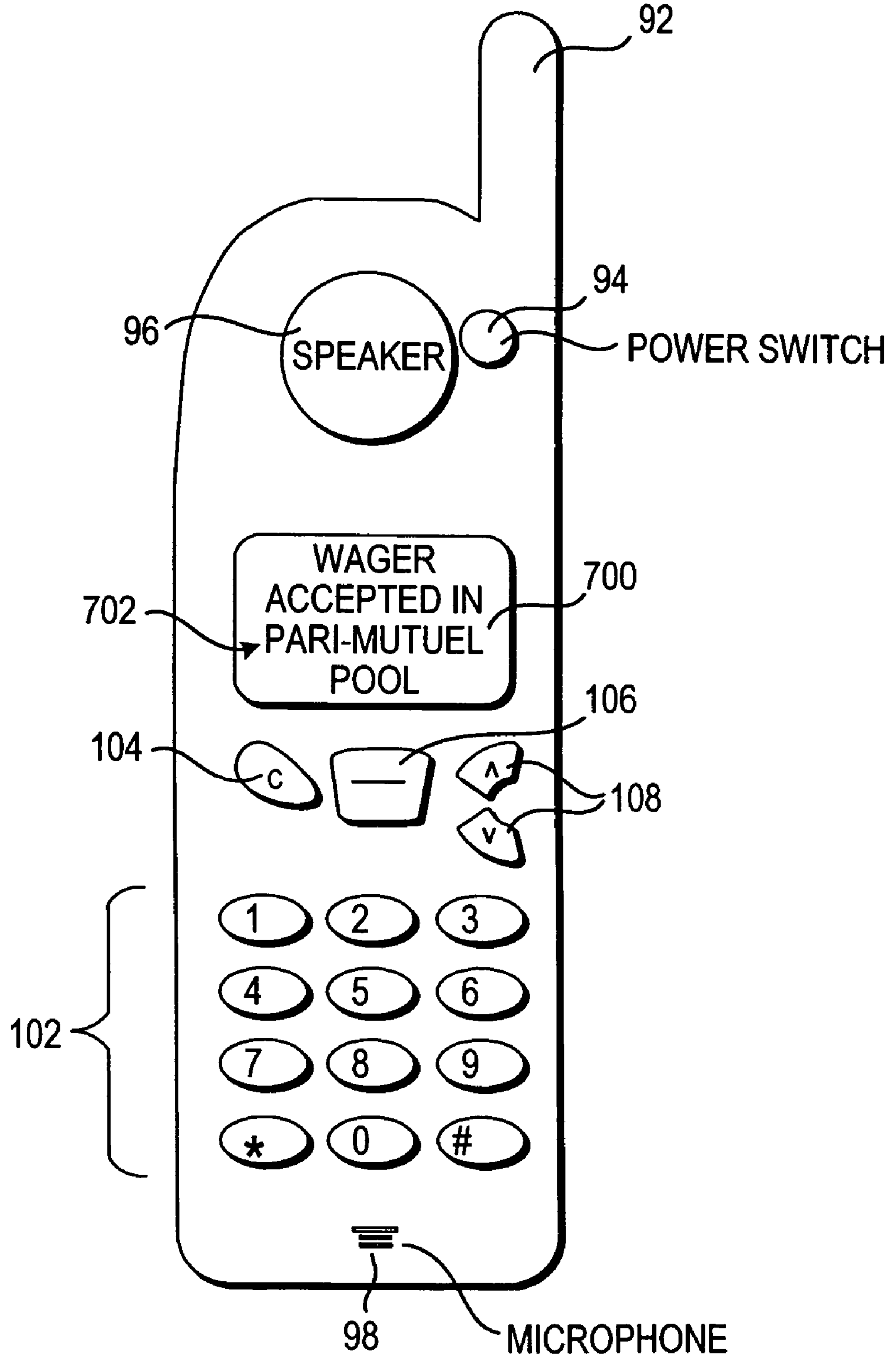
FIG. 16 shows an illustrative cellular telephone display containing illustrative information that may be provided in accordance with one embodiment of the present invention.

FIG. 16 shows an illustrative display 700 that may be provided by an interactive wagering application implemented on user telephone equipment, for example, cellular telephone equipment. Display 700 may be provided on, for example, cellular telephone 90 (FIG. 5). Indicator 702 may be displayed on display 700 after a user has created and submitted a wager. For example, information 702 may pop up on display 700 after the wager has been submitted and accepted.

The user may be alerted to the presence of indicator 702 through a series of beeps or any other suitable audio indicator emitted by speaker 96. The use of audio indicators is merely illustrative. Any other suitable technique for obtaining the user's attention may be used (e.g., vibrations).

Due to the small size of display 700, information 702 may only include a small amount of information at a time. To obtain additional information, the user may use arrow keys 108 to scroll through race-related information. In another suitable approach, the interactive wagering application and interactive wagering system 10 may provide the user with the ability to call a specific phone number to obtain more information on the race and the wager. If the cellular telephone is capable of accessing the World Wide Web, the user may be given the ability to obtain additional information from a race-related website via that functionality.

Figure 17:
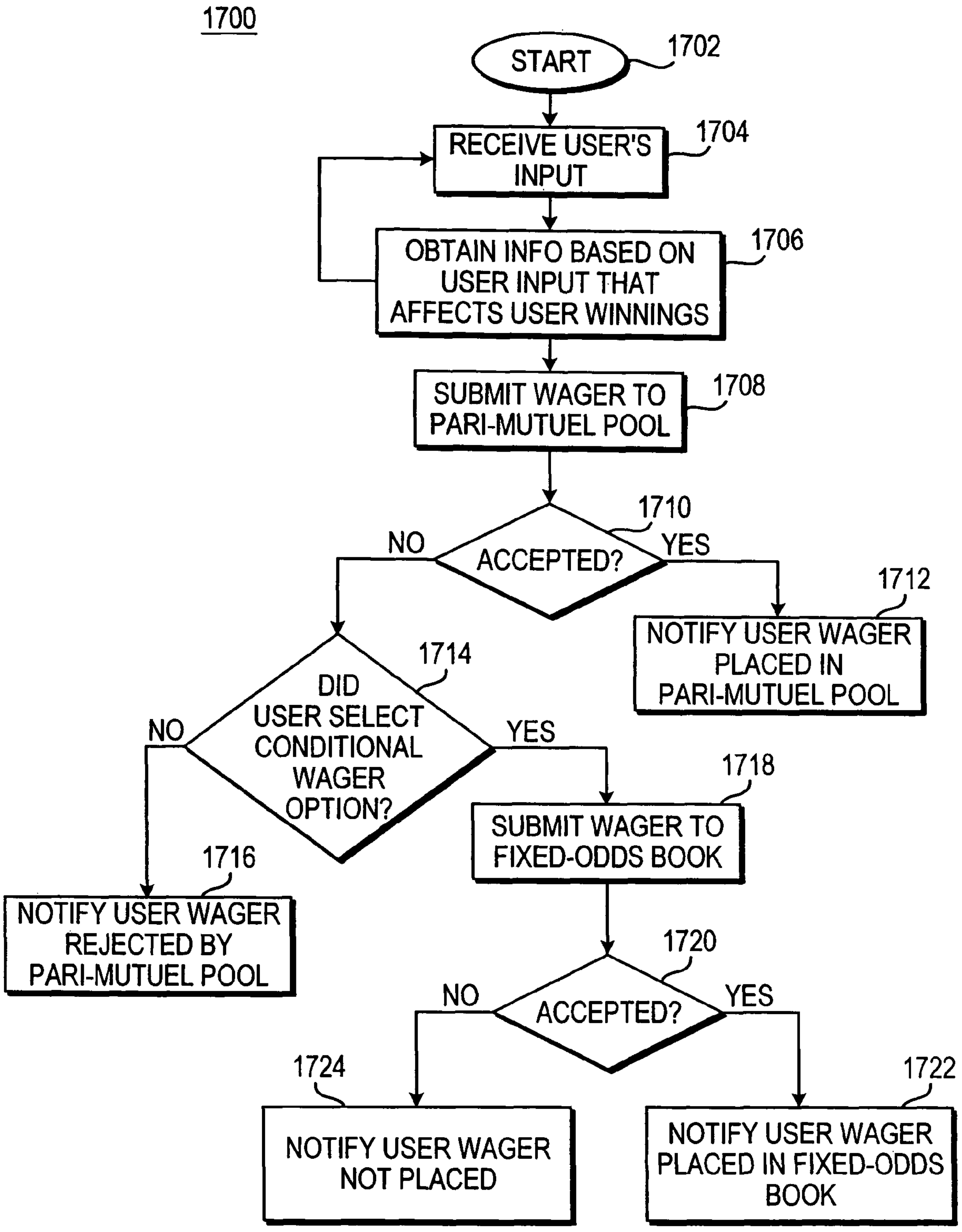
FIGS. 17-18 are flow charts of illustrative steps involved in providing the user with the ability to place a wager in a fixed-odds book or a pari-mutuel pool.

FIG. 17 shows a flow chart 1700 of illustrative steps involved in providing the user with the ability to automatically place a wager in a fixed-odds book if a pari-mutuel pool wager is not accepted. Flow chart 1700 starts at step 1702. At step 1704, the interactive wagering application may receive the user's wager inputs. For example, the interactive wagering application may receive the user's racetrack, race, wager type, horse, wager amount, and wager option selections. At step 1706, the interactive wagering application may receive and display information to guide the user in selecting wager options and in response to user wager option selections. Steps 1704 and 1706 may repeat until the user has created a wager. At step 1708, the interactive wagering application may submit the wager. The interactive wagering application may submit the wager in response to a user's input. At step 1710, the interactive wagering application determines whether the user's wager is accepted by the pari-mutuel pool. If the wager is accepted, the interactive wagering application notifies the user that the wager was placed in the pari-mutuel pool at step 1712. If the user's wager is not accepted, the interactive wagering application determines at step 1714 whether the user had selected the conditional wager option to automatically place a pari-mutuel pool wager in a fixed-odds book in the event that the wager is rejected by the pari-mutuel pool. If the user had not selected the conditional wager option, the interactive wagering application notifies the user that the wager was rejected at step 1716. If the user had selected the conditional wager option, the interactive wagering application submits the wager to a fixed-odds book at step 1718. At step 1720, the interactive wagering application determines whether the user's wager is accepted by the fixed-odds book. If the wager is accepted, the interactive wagering application notifies the user that the wager was placed in the fixed-odds book at step 1722. If the wager is not accepted, the interactive wagering application notifies the user that the wager was not placed at step 1724.

Figure 18:
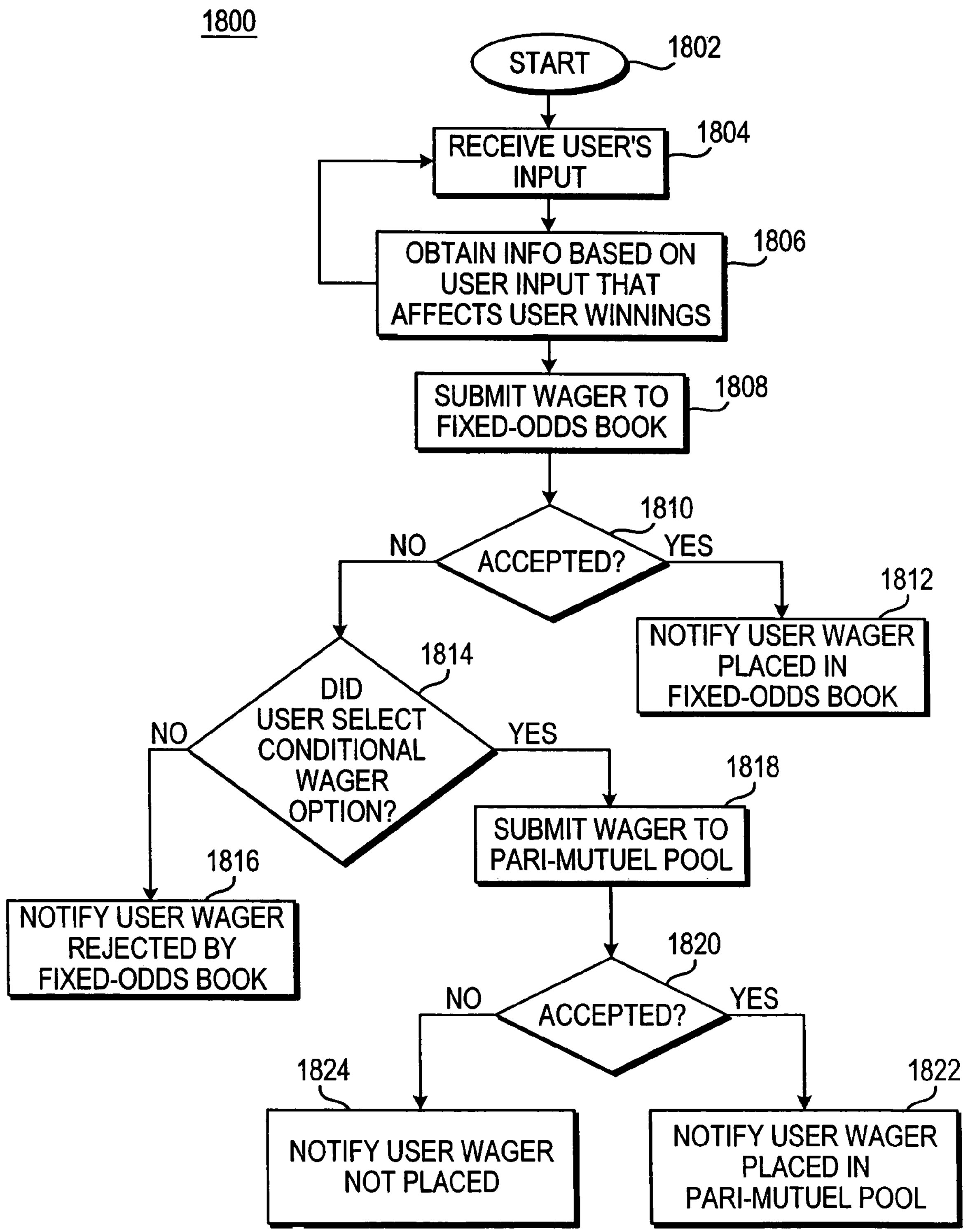

FIG. 18 shows a flow chart 1800 of illustrative steps involved in providing the user with the ability to automatically place a wager in a pari-mutuel pool if the fixed-odds book wager is not accepted. Flow chart 1800 starts at step 1802. At step 1804, the interactive wagering application may receive the user's wager inputs. For example, the interactive wagering application may receive the user's racetrack, race, wager type, horse, wager amount, and wager option selections. At step 1806, the interactive wagering application may receive and display information to guide the user in selecting wager options and in response to user wager option selections. Steps 1804 and 1806 may repeat until the user has created a wager. At step 1808, the interactive wagering application may submit the wager. The interactive wagering application may submit the wager in response to a user's input. At step 1810, the interactive wagering application determines whether the user's wager is accepted by the fixed-odds book. If the wager is accepted, the interactive wagering application notifies the user that the wager was placed in the fixed-odds book at step 1812. If the user's wager is not accepted, the interactive wagering application determines at step 1814 whether the user had selected the conditional wager option to automatically place a fixed-odds book wager in a pari-mutuel pool in the event that the wager is rejected by the fixed-odds book. If the user had not selected the conditional wager option, the interactive wagering application notifies the user that the wager was rejected at step 1816. If the user had selected the conditional wager option, the interactive wagering application submits the wager to a pari-mutuel pool at step 1818. At step 1820, the interactive wagering application determines whether the user's wager is accepted by the fixed-odds book. If the wager is accepted, the interactive wagering application notifies the user that the wager was placed in the fixed-odds book at step 1822. If the wager is not accepted, the interactive wagering application notifies the user that the wager was not placed at step 1824.

Thus methods and systems for providing the user with the ability to place a wager in a fixed-odds book or a pari-mutuel pool are described. Methods and systems for providing the user with conditional fixed-odds and pari-mutuel wagering are also described. One skilled in the art will appreciate that the present invention may be practiced by other than the described embodiments, which are presented for purposes of illustration and not of limitation, and the present invention is limited only by the claims that follow.

What is claimed is:

1. A method for a user at user equipment comprising a user input interface, a display, and control circuitry to interactively wager on races with an interactive wagering application implemented using the user equipment, comprising:

creating a wager using the user input interface;

submitting the wager to a fixed-odds book using the control circuitry;

prompting the user on the display to make a selection using the user input interface to submit the wager to a pari-mutuel pool when the wager is not accepted by the fixed odds book; and in response to the selection, submitting the wager to the pari-mutuel pool using the control circuitry.

2. The method defined in claim 1 further comprising displaying the fixed-odds book odds and the pari-mutuel pool odds for the wager on the display.

3. The method defined in claim 1 further comprising notifying the user of the status of the wager on the display, wherein the status is selected from the group consisting of wager is accepted by the pari-mutuel pool and wager is not accepted by the pari-mutuel pool, wager is accepted by the fixed-odds book, and wager is not accepted by the fixed-odds book.

4. The method defined in claim 3 further comprising sending an e-mail to the user in order to notify the user of the status of the wager.

5. The method defined in claim 3 further comprising displaying information on the display to notify the user of the status of the wager.

6. The method defined in claim 5 further comprising displaying the information in an overlay on top of a television display.

7. The method defined in claim 5 further comprising displaying the information in a window on a computer monitor.

8. A method for a user at user equipment comprising a user input interface, a display, and control circuitry to interactively wager on races with an interactive wagering application implemented using the user equipment, comprising:

creating a wager using the user input interface;

submitting the wager to a pari-mutuel pool using the control circuitry;

prompting the user on the display to make a selection using the user input interface to submit the wager to a fixed-odds book when the wager is not accepted by the pari-mutuel pool; and in response to the selection, submitting the wager to the fixed odds book using the control circuitry.

9. The method defined in claim 8 further comprising displaying the fixed-odds book odds and the pari-mutuel pool odds for the wager on the display.

10. The method defined in claim 8 further comprising notifying the user of the status of the wager on the display, wherein the status is selected from the group consisting of wager is accepted by the pari-mutuel pool and wager is not accepted by the pari-mutuel pool, wager is accepted by the fixed-odds book, and wager is not accepted by the fixed-odds book.

11. The method defined in claim 10 further comprising sending an e-mail to the user in order to notify the user of the status of the wager.

12. The method defined in claim 10 further comprising displaying information on the display to notify the user of the status of the wager.

13. The method defined in claim 12 further comprising displaying the information in an overlay on top of a television display.

14. The method defined in claim 12 further comprising displaying the information in a window on a computer monitor.

15. A system for a user at user equipment to interactively wager on races with an interactive wagering application implemented using the user equipment, comprising:

means for creating a wager;

means for submitting the wager to a fixed-odds book;

means for prompting the user to make a selection to submit the wager to a pari-mutuel pool when the wager is not accepted by the fixed-odds book; and means for submitting the wager to the pari-mutuel pool in response to the selection.

16. The system defined in claim 15 further comprising means for displaying the fixed-odds book odds and the pari-mutuel pool odds for the wager.

17. The system defined in claim 15 further comprising means for notifying the user of the status of the wager, wherein the status is selected from the group consisting of wager is accepted by the pari-mutuel pool and wager is not accepted by the pari-mutuel pool, wager is accepted by the fixed-odds book, and wager is not accepted by the fixed-odds book.

18. The system defined in claim 17 further comprising means for sending an e-mail to the user in order to notify the user of the status of the wager.

19. The system defined in claim 17 further comprising means for displaying information to notify the user of the status of the wager.

20. The system defined in claim 19 further comprising means for displaying the information in an overlay on top of a television display.

21. The system defined in claim 19 further comprising means for displaying the information in a window on a computer monitor.

22. A system for a user at user equipment to interactively wager on races with an interactive wagering application implemented using the user equipment, comprising:

means for creating a wager;

means for submitting the wager to a pari-mutuel pool;

means for prompting the user to make a selection to submit the wager to a fixed-odds book when the wager is not accepted by the pari-mutuel pool; and means for submitting the wager to the fixed-odds book in response to the selection.

23. The system defined in claim 22 further comprising means for displaying the fixed-odds book odds and the pari-mutuel pool odds for the wager.

24. The system defined in claim 22 further comprising means for notifying the user of the status of the wager, wherein the status is selected from the group consisting of wager is accepted by the pari-mutuel pool and wager is not accepted by the pari-mutuel pool, wager is accepted by the fixed-odds book, and wager is not accepted by the fixed-odds book.

25. The system defined in claim 24 further comprising means for sending an e-mail to the user in order to notify the user of the status of the wager.

26. The system defined in claim 24 further comprising means for displaying information to notify the user of the status of the wager.

27. The system defined in claim 26 further comprising means for displaying the information in an overlay on top of a television display.

28. The system defined in claim 26 further comprising means for displaying the information in a window on a computer monitor.

29. User equipment comprising a user input interface, a display, and control circuitry for a user to interactively wager on races with an interactive wagering application implemented using the user equipment, the user equipment configured to:

create a wager using the user input interface;

submit the wager to a fixed-odds book using the control circuitry;

prompt the user on the display to make a selection using the user input interface to submit the wager to a pari-mutuel pool when the wager is not accepted by the fixed odds book; and submit the wager to the pari-mutuel pool in response to the selection using the control circuitry.

30. The user equipment defined in claim 29 is further configured to display the fixed-odds book odds and the pari-mutuel pool odds for the wager on the display.

31. The user equipment defined in claim 29 is further configured to notify the user of the status of the wager on the display, wherein the status is selected from the group consisting of wager is accepted by the pari-mutuel pool and wager is not accepted by the pari-mutuel pool, wager is accepted by the fixed-odds book, and wager is not accepted by the fixed-odds book.

32. The user equipment defined in claim 31 is further configured to send an e-mail to the user in order to notify the user of the status of the wager.

33. The user equipment defined in claim 31 is further configured to display information on the display to notify the user of the status of the wager.

34. The user equipment defined in claim 33 is further configured to display the information in an overlay on top of a television display.

35. The user equipment defined in claim 33 is further configured to display the information in a window on a computer monitor.

36. User equipment comprising a user input interface, a display, and control circuitry for a user to interactively wager on races with an interactive wagering application implemented using the user equipment, the user equipment configured to:

create a wager using the user input interface;

submit the wager to a pari-mutuel pool using the control circuitry;

prompt the user on the display to make a selection using the user input interface to submit the wager to a fixed-odds book when the wager is not accepted by the pari-mutuel pool; and submit the wager to the fixed-odds book in response to the selection using the control circuitry.

37. The user equipment defined in claim 36 is further configured to display the fixed-odds book odds and the pari-mutuel pool odds for the wager on the display.

38. The user equipment defined in claim 36 is further configured to notify the user of the status of the wager on the display, wherein the status is selected from the group consisting of wager is accepted by the pari-mutuel pool and wager is not accepted by the pari-mutuel pool, wager is accepted by the fixed-odds book, and wager is not accepted by the fixed-odds book.

39. The user equipment defined in claim 38 is further configured to send an e-mail to the user in order to notify the user of the status of the wager.

40. The user equipment defined in claim 38 is further configured to display information on the display to notify the user of the status of the wager.

41. The user equipment defined in claim 40 is further configured to display the information in an overlay on top of a television display.

42. The user equipment defined in claim 40 is further configured to display the information in a window on a computer monitor.

43. Non-transitory computer readable medium having computer program logic recorded thereon for:

creating a wager;

submitting the wager to a fixed-odds book;

prompting the user to make a selection to submit the wager to a pari-mutuel pool when the wager is not accepted by the fixed odds book; and in response to the selection, submitting the wager to the pari-mutuel pool.

44. The non-transitory computer readable medium defined in claim 43 further comprising computer program logic recorded thereon for displaying the fixed-odds book odds and the pari-mutuel pool odds for the wager.

45. The non-transitory computer readable medium defined in claim 43 further comprising computer program logic recorded thereon for notifying the user of the status of the wager, wherein the status is selected from the group consisting of wager is accepted by the pari-mutuel pool and wager is not accepted by the pari-mutuel pool, wager is accepted by the fixed-odds book, and wager is not accepted by the fixed-odds book.

46. The non-transitory computer readable medium defined in claim 45 further comprising computer program logic recorded thereon for sending an e-mail to the user in order to notify the user of the status of the wager.

47. The non-transitory computer readable medium defined in claim 45 further comprising computer program logic recorded thereon for displaying information to notify the user of the status of the wager.

48. The non-transitory computer readable medium defined in claim 47 further comprising computer program logic recorded thereon for displaying the information in an overlay on top of a television display.

49. The non-transitory computer readable medium defined in claim 47 further comprising computer program logic recorded thereon for displaying the information in a window on a computer monitor.

50. Non-transitory computer readable medium having computer program logic recorded thereon for:

creating a wager;

submitting the wager to a pari-mutuel pool;

prompting the user to make a selection to submit the wager to a fixed-odds book when the wager is not accepted by the pari-mutuel pool; and in response to the selection, submitting the wager to the fixed odds book.

51. The non-transitory computer readable medium defined in claim 50 further comprising computer program logic recorded thereon for displaying the fixed-odds book odds and the pari-mutuel pool odds for the wager.

52. The non-transitory computer readable medium defined in claim 50 further comprising computer program logic recorded thereon for notifying the user of the status of the wager, wherein the status is selected from the group consisting of wager is accepted by the pari-mutuel pool and wager is not accepted by the pari-mutuel pool, wager is accepted by the fixed-odds book, and wager is not accepted by the fixed-odds book.

53. The non-transitory computer readable medium defined in claim 52 further comprising computer program logic recorded thereon for sending an e-mail to the user in order to notify the user of the status of the wager.

54. The non-transitory computer readable medium defined in claim 52 further comprising computer program logic recorded thereon for displaying information to notify the user of the status of the wager.

55. The non-transitory computer readable medium defined in claim 54 further comprising computer program logic recorded thereon for displaying the information in an overlay on top of a television display.

56. The non-transitory computer readable medium defined in claim 54 further comprising computer program logic recorded thereon for displaying the information in a window on a computer monitor.

* * * * *